(12) United States Patent
Shionozaki

(10) Patent No.: US 10,852,813 B2
(45) Date of Patent: Dec. 1, 2020

(54) INFORMATION PROCESSING SYSTEM, CLIENT TERMINAL, INFORMATION PROCESSING METHOD, AND RECORDING MEDIUM

(71) Applicant: SONY CORPORATION, Tokyo (JP)

(72) Inventor: Atsushi Shionozaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 158 days.

(21) Appl. No.: 16/074,666

(22) PCT Filed: Nov. 22, 2016

(86) PCT No.: PCT/JP2016/084647
§ 371 (c)(1),
(2) Date: Aug. 1, 2018

(87) PCT Pub. No.: WO2017/145466
PCT Pub. Date: Aug. 31, 2017

(65) Prior Publication Data
US 2019/0033957 A1  Jan. 31, 2019

(30) Foreign Application Priority Data
Feb. 26, 2016  (JP) ................ 2016-035543

(51) Int. Cl.
*G06F 3/01*  (2006.01)
*G10L 25/63*  (2013.01)
(Continued)

(52) U.S. Cl.
CPC ............... *G06F 3/01* (2013.01); *G06F 3/011* (2013.01); *G06F 16/00* (2019.01);
(Continued)

(58) Field of Classification Search
CPC ...... H04M 3/5233; G10L 25/63; G10L 25/27; G06F 3/01; G06N 20/00
(Continued)

(56) References Cited

U.S. PATENT DOCUMENTS 9,479,643 B1* 10/2016 Abuelsaad .......... H04M 3/5233
9,716,792 B2*  7/2017 McGann ............. H04M 3/5191
2015/0003603 A1* 1/2015 Odinak ................... G06F 40/10
379/265.11

FOREIGN PATENT DOCUMENTS

JP   2005-122549 A   5/2005
JP   2005-222331 A   8/2005
(Continued)

OTHER PUBLICATIONS

International Search Report and Written Opinion of PCT Application No. PCT/JP2016/084647, dated Feb. 14, 2017, 07 pages of ISRWO.

*Primary Examiner* — Thjuan K Addy
(74) *Attorney, Agent, or Firm* — Chip Law Group

(57) ABSTRACT

To provide an information processing system, a client terminal, an information processing method, and a recording medium capable of selecting an appropriate agent from among multiple agents according to a user emotion, and providing more comfortable dialogue.

An information processing system including: a storage section that holds a plurality of agent programs with different attributes; a communication section that provides an agent service by the agent programs to a client terminal of a user; and a control section that selects, from among the plurality of agent programs, one agent program suited to an emotion of a user who can use the agent service.

26 Claims, 18 Drawing Sheets

(51) Int. Cl.
  *G10L 17/22* (2013.01)
  *G06F 16/00* (2019.01)
  *G06Q 30/06* (2012.01)
  *G10L 13/10* (2013.01)

(52) U.S. Cl.
  CPC .......... *G06Q 30/0631* (2013.01); *G10L 17/22* (2013.01); *G06F 2203/011* (2013.01); *G10L 13/10* (2013.01); *G10L 25/63* (2013.01)

(58) Field of Classification Search
  USPC ............ 379/265.07, 265.05, 265.01, 265.11, 379/265.12
  See application file for complete search history.

(56) References Cited

FOREIGN PATENT DOCUMENTS

| | | |
|---|---|---|
| JP | 2005-339368 A | 12/2005 |
| JP | 2015-069455 A | 4/2015 |

* cited by examiner

FIG. 13

| AGENT ID | QUESTION | ADVERTISEMENT CONTENT | CONDITIONS ETC. | PROBABILITY 0-1 |
|---|---|---|---|---|
| CHARACTER A | "CHOCOLATE" | "THE NEW CHOCOLATE ON SALE FROM BB CO. CONTAINS A LOT OF MILK AND IS DELICIOUS" | USER IS UNDER 30 | 0.5 |
| CHARACTER A, PERSON B | "I WANT TO EAT SOMETHING DELICIOUS" | "THEY SAY THE BARBECUE AT CC IS DELICIOUS" | YEAR-END PARTY SEASON (DECEMBER) | 0.5 |
| ALL | "I'M THIRSTY" | "AA WATER (PRODUCT NAME) IS GOOD FOR QUENCHING THIRST" | — | 0.1 |

621

INFORMATION PROCESSING SYSTEM, CLIENT TERMINAL, INFORMATION PROCESSING METHOD, AND RECORDING MEDIUM

CROSS REFERENCE TO RELATED APPLICATIONS

This application is a U.S. National Phase of International Patent Application No. PCT/JP2016/084647 filed on Nov. 22, 2016, which claims priority benefit of Japanese Patent Application No. JP 2016-035543 filed in the Japan Patent Office on Feb. 26, 2016. Each of the above-referenced applications is hereby incorporated herein by reference in its entirety.

TECHNICAL FIELD

The present disclosure relates to an information processing system, a client terminal, an information processing method, and a recording medium.

BACKGROUND ART

In recent years, advances in communication technologies have led to the frequent exchange of messages over networks. Using an information processing terminal such as a smartphone, a mobile phone terminal, or a tablet terminal, a user is able to check messages transmitted from other terminals, and transmit messages.

Also, an agent system that automatically responds to user messages on an information processing terminal has been proposed. Regarding such a system, for example, Patent Literature 1 below describes a conversation sentence generation device capable of artificially applying various personalities to an automated response to a user.

Also, Patent Literature 2 below describes an emotion grasping system that interacts with a user, and estimates the user's emotion from text and operations exchanged during the interaction. Also, such an emotion grasping system is provided with a customer service manual that recommends an attitude during the interaction according to the user's emotion.

CITATION LIST

Patent Literature

Patent Literature 1: JP 2015-69455A
Patent Literature 2: JP 2005-339368A

DISCLOSURE OF INVENTION

Technical Problem

Herein, in an agent system that makes automated responses, a personality may be applied to an agent and provided to the user as a specific character, but it is also anticipated that the appropriate character for the user may be different depending on the user's mood. However, neither of the patent literature described above makes any considerations for switching the agent character. For example, the emotion grasping system described in Patent Literature 2 above is provided with a customer service manual that recommends an attitude during interaction according to the user's emotion, but this merely changes how the agent speaks, and does not change the character.

Accordingly, the present disclosure proposes an information processing system, a client terminal, an information processing method, and a recording medium capable of selecting an appropriate agent from among multiple agents according to a user emotion, and providing more comfortable dialogue.

Solution to Problem

According to the present disclosure, there is proposed an information processing system including: a storage section that holds a plurality of agent programs with different attributes; a communication section that provides an agent service by the agent programs to a client terminal of a user; and a control section that selects, from among the plurality of agent programs, one agent program suited to an emotion of a user who can use the agent service.

According to the present disclosure, there is proposed a client terminal including: a communication section that receives dialogue by an agent service by an agent program from a server that holds a plurality of agent programs with different attributes; and a control section that controls a transmission, to the server through the communication section, of user-related information needed by the server to select, from among the plurality of agent programs, one agent program suited to an emotion of a user who can use the agent service.

According to the present disclosure, there is proposed an information processing system including: a storage section that holds a plurality of agent programs with different attributes; an interface section that provides an agent service by the agent program to a user; and a control section that selects one agent program suited to an emotion of a user who can use the agent service by the agent program, and executes the selected agent program to thereby provide a specific agent service to the user through the interface section.

According to the present disclosure, there is proposed an information processing method including, by a processor: holding a plurality of agent programs with different attributes in a storage section; providing, through a communication section, an agent service by the agent programs to a client terminal of a user; and selecting, from among the plurality of agent programs, one agent program suited to an emotion of a user who can use the agent service.

According to the present disclosure, there is proposed a recording medium having a program recorded thereon, the program causing a computer to function as: a communication section that receives dialogue by an agent service by an agent program from a server that holds a plurality of agent programs with different attributes; and a control section that controls a transmission, to the server through the communication section, of user-related information needed by the server to select, from among the plurality of agent programs, one agent program suited to an emotion of a user who can use the agent service.

According to the present disclosure, there is proposed a recording medium having a program recorded thereon, the program causing a computer to function as: a storage section that holds a plurality of agent programs with different attributes; an interface section that provides an agent service by the agent program to a user; and a control section that selects one agent program suited to an emotion of a user who can use the agent service by the agent program, and executes the selected agent program to thereby provide a specific agent service to the user through the interface section.

Advantageous Effects of Invention

According to the present disclosure as described above, it becomes possible select an appropriate agent from among multiple agents according to a user emotion, and provide more comfortable dialogue.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 13 is a diagram illustrating an example of advertisement information registered in an advertisement DB according to the present embodiment.

MODE(S) FOR CARRYING OUT THE INVENTION

Figure 1:
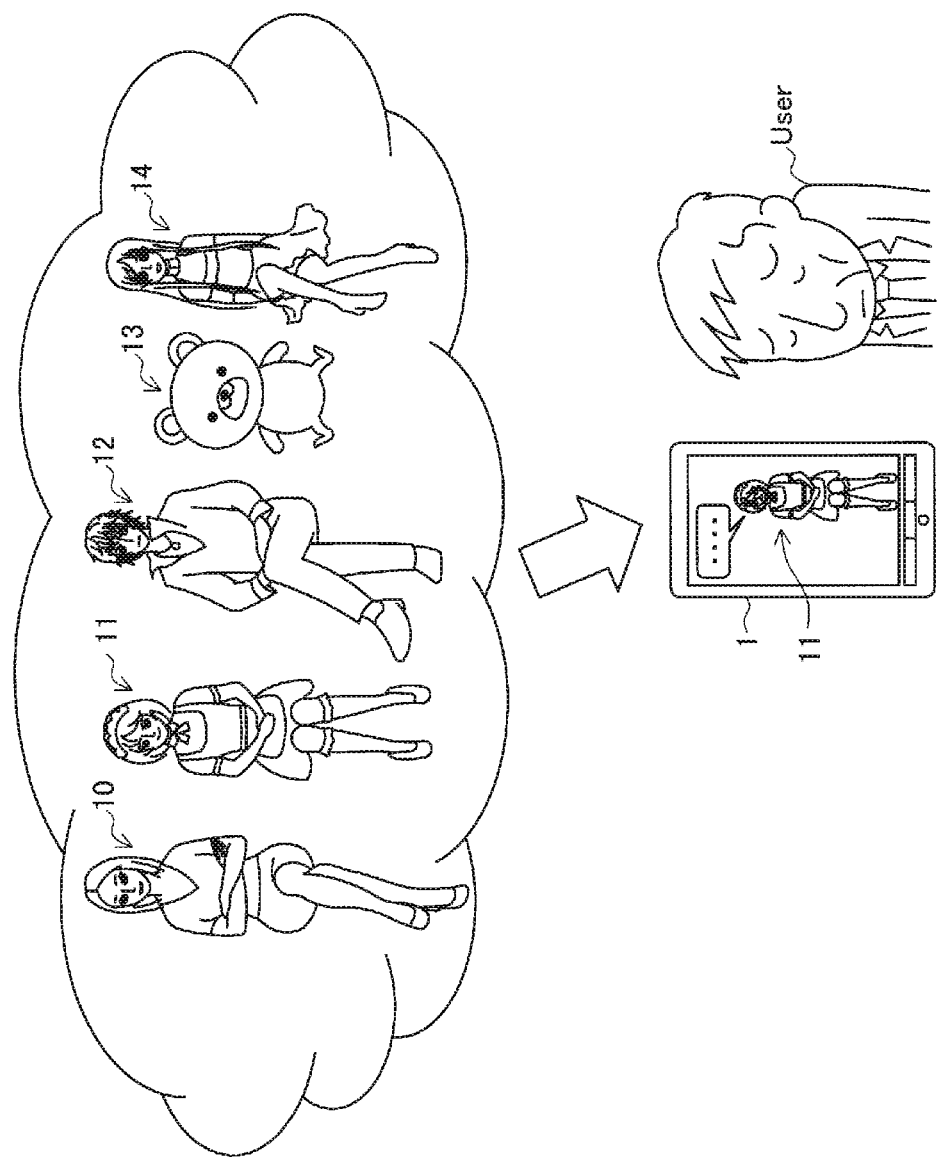
FIG. 1 is a diagram explaining a summary of a communication control system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.

1. Summary of communication control system according to embodiment of present disclosure
2. Configuration
   2-1. System configuration
   2-2. Server configuration
3. System operating processes
   3-1. Conversation data registration process
   3-2. Phoneme DB generation process
   3-3. Dialogue control process
   3-4. Conversation DB update process
   3-5. Advertisement insertion process
4. Dialogue process
   4-1. Configuration
   4-2. Operating processes
5. Conclusion 1. SUMMARY OF COMMUNICATION CONTROL SYSTEM ACCORDING TO EMBODIMENT OF PRESENT DISCLOSURE The communication control system (agent system) according to an embodiment of the present disclosure selects an appropriate agent from among multiple agents according to a user emotion, thereby making it possible to provide more comfortable dialogue. Hereinafter, a summary of the communication control system according to the present embodiment will be described with reference to FIG. 1.

FIG. 1 is a diagram explaining a summary of the communication control system according to an embodiment of the present disclosure. Dialogue between a user and an agent may be performed via a client terminal 1, such as a smartphone, a tablet terminal, or the like, for example. The client terminal 1 includes a microphone and a speaker, and is capable of speech-based dialogue with the user. Also, the client terminal 1 is provided with a display, and it is possible to display an image of the agent, and additionally display utterances of the agent as text.

The agent according to the present embodiment engages in dialogue with the user, and may a variety of agent services depending on the situation, such as providing recommendations about the real world, content on the Internet, or the like, providing information such as news, weather forecasts, and the like, providing games, giving directions, and the like. In addition, the communication control system according to the present embodiment may prepare multiple agents, each having a different personality, and the user may select and purchase an arbitrary agent. Also, the communication control system according to the present embodiment includes a function (learning function) of acquiring user feedback with respect to utterances of the agent, and causing the agent to grow on the basis of the feedback.

BACKGROUND

Herein, as described above, it is anticipated that the appropriate character of the agent for the user may be different depending on the user's mood, but neither of the patent literature described above makes any considerations for switching the agent character.

Accordingly, in the present disclosure, in the agent system that executes automatic dialogue with the user, an appropriate agent is selected from among multiple agents according to a user emotion, thereby making it possible to provide more comfortable dialogue. Also, if the selected agent is user-owned (that is, already purchased), agent switching is performed, whereas if not yet purchased, it becomes possible to recommend purchase to the user.

The emotion (or psychological state) of the user may be estimated on the basis of information detected from various sensors provided in a wearable terminal (such as a smart band, a smart watch, smart eyeglasses, a smart neckband, or the like) worn by the user, and various sensors provided in the client terminal 1. For example, the user's emotion or psychological state is estimated on the basis of the user's facial expression captured by a camera provided in the client terminal 1, the user's speech collected by a microphone provided in the client terminal 1 or the wearable terminal, the user's biological information detected by a biological sensor provided in the wearable terminal, and the like.

Subsequently, the communication control system selects an agent of an appropriate character from among multiple agents 10 to 14, in accordance with the emotion or psychological state of the user. The communication control system may select an appropriate agent from among user-owned (that is, already purchased) agents, or may recommend the purchase of an appropriate agent if the appropriate agent has not been purchased yet. For example, a different agent is recommended depending on the emotion or psychological state of the user, such as recommending a kind and soothing agent in the case in which the user is in a sad mood, and recommending a strong-minded older sister-type agent in the case in which the user is in an upbeat mood. If the recommended agent is user-owned, the communication control system may automatically switch to the recommended agent and initiate the dialogue, whereas if the recommended agent is not user-owned, the communication control system may recommend purchase, and once a purchasing process is completed, switch to the recommended agent and initiate the dialogue.

Note that in the present embodiment, a user evaluation with respect to the agent recommended by the communication control system may also be acquired as feedback, and the recommendation accuracy may be improved. In addition, the communication control system according to the present embodiment is not limited to a speech agent that responds by speech, and may also be a text-supporting agent that responds in a text-based manner on the client terminal 1.

Also, the communication control system according to the present embodiment may be installed in an information processing apparatus such as a smartphone, a tablet terminal, or a PC, and may also be built into a home system, an in-vehicle system, or a client-server system including a client terminal and a server. In addition, the communication control system according to the present embodiment may also be installed in an anthropomorphic device, such as a robot. In the case of a robot, in addition to speech dialogue, expression control and action control may also be executed.

2. CONFIGURATION

<2-1. System Configuration>

Figure 2:
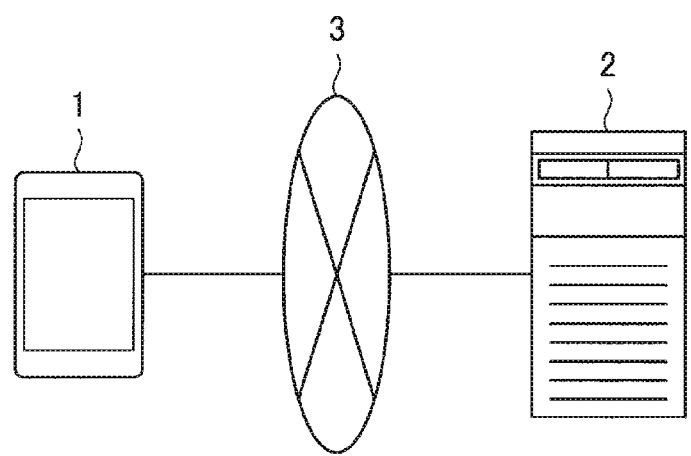
FIG. 2 is a diagram illustrating the overall configuration of the communication control system according to the present embodiment.

Next, an overall configuration of the communication control system according to the present embodiment described above will be described with reference to FIG. 2. FIG. 2 is a diagram illustrating the overall configuration of the communication control system according to the present embodiment.

As illustrated in FIG. 2, the communication control system according to the present embodiment includes a client terminal 1 and an agent server 2.

The agent server 2 connects to the client terminal 1 through a network 3, transmitting and receiving data. Specifically, the agent server 2 generates response speech with respect to uttered speech collected and transmitted by the client terminal 1, and transmits the response speech to the client terminal 1. The agent server 2 includes a phoneme database (DB) corresponding to one or more agents, and is capable of generating response speech in the voice of a specific agent. Herein, the agents may be characters from a comic book, anime, game, drama, movie, or the like, person such as celebrities, historical figures, or the like, but may also be average persons of different generations, without being specific individuals, for example. Additionally, the agents may also be animals or anthropomorphic characters. Additionally, the agents may also be a person reflecting the personality of the user oneself, or persons reflecting the personality of the user's friends, family members, acquaintances, or the like.

Also, the agent server 2 is capable of generating response content reflecting the personality of each agent. Through the agent, the agent server 2 may a variety of services through dialogue with the user, such as management of the user's schedule, the transmission and reception of messages, and information provision.

Note that the client terminal 1 is not limited to a smartphone as illustrated in FIG. 2, and may also be, for example, a mobile phone terminal, a tablet terminal, a personal computer (PC), a game console, a wearable terminal (such as smart eyeglasses, a smart band, a smart watch, or a smart neckband), or the like. Additionally, the client terminal 1 may also be a robot.

The above describes a summary of the communication control system according to the present embodiment. Next, the configuration of the agent server 2 of the communication control system according to the present embodiment will be described specifically with reference to FIG. 3.

<2-2. Agent Server 2>

Figure 3:
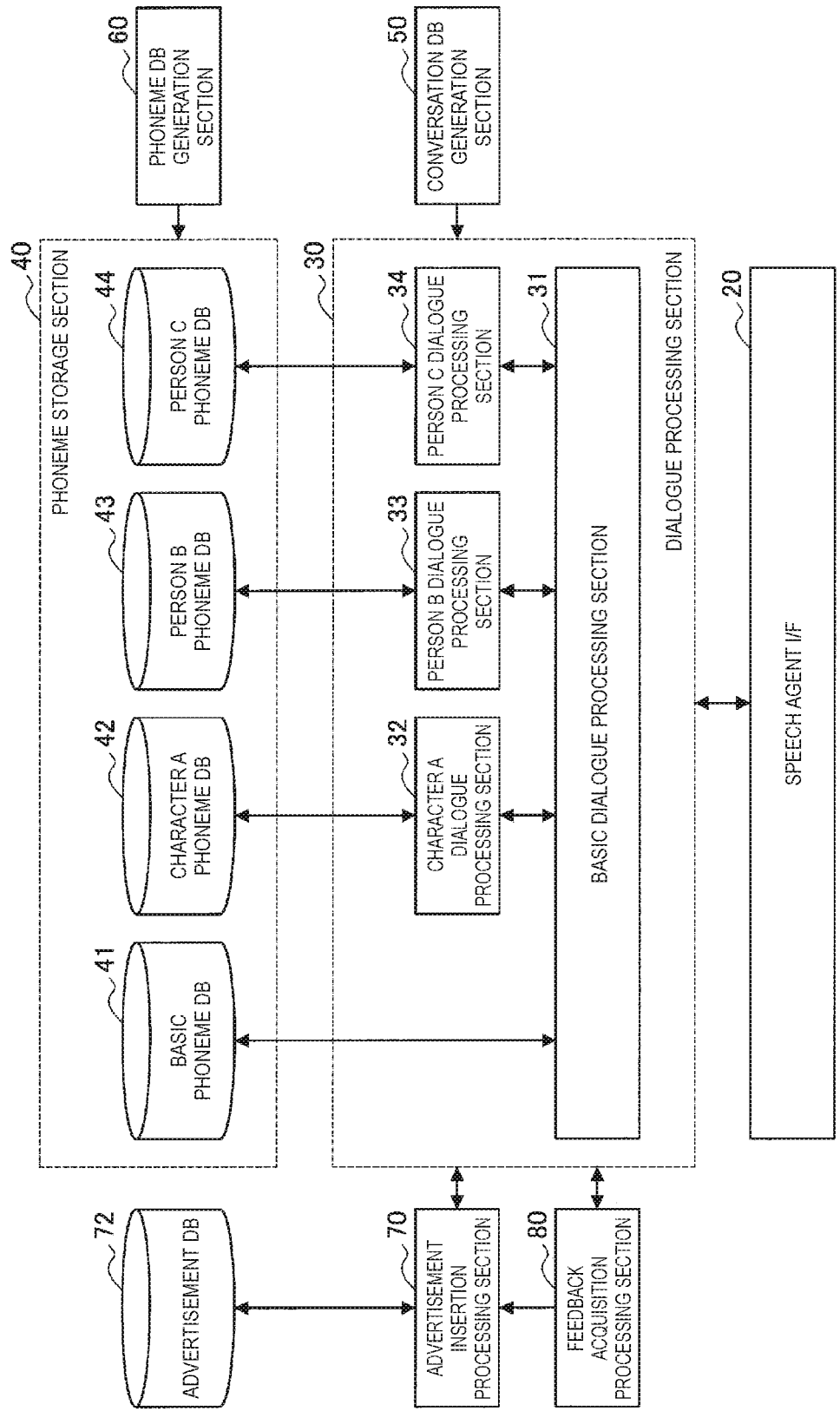
FIG. 3 is a block diagram illustrating an example of a configuration of a speech agent server according to the present embodiment.

FIG. 3 is a block diagram illustrating an example of the configuration of the agent server 2 according to the present embodiment. As illustrated in FIG. 3, the agent server 2 includes a speech agent interface (I/F) 20, a dialogue processing section 30, a phoneme storage section 40, a conversation DB generation section 50, a phoneme DB generation section 60, an advertisement insertion processing section 70, an advertisement DB 72, and a feedback acquisition processing section 80.

The speech agent I/F 20 functions as an input/output section of speech data, a speech recognition section, and a speech generation section. For the input/output section, a communication section that transmits and receives with the client terminal 1 through the network 3 is anticipated. The speech agent I/F 20 is capable of receiving the user's uttered speech from the client terminal 1, and converting the speech to text by speech recognition. In addition, the speech agent I/F 20 converts response data (text) of the agent output from the dialogue processing section 30 into speech by using phoneme data corresponding to the agent, and transmits the generated response speech of the agent to the client terminal 1.

The dialogue processing section 30 functions as a computational processing device and control device, and controls overall operation inside the agent server 2 by following various programs. The dialogue processing section 30 is realized by an electronic circuit such as a central processing unit (CPU) or a microprocessor, for example. In addition, the dialogue processing section 30 according to the present embodiment functions as a basic dialogue processing section 31, a character A dialogue processing section 32, a person B dialogue processing section 33, and a person C dialogue processing section 34.

The character A dialogue processing section 32, the person B dialogue processing section 33, and the person C dialogue processing section 34 realize dialogue specialized for each agent. Herein, "character A", "person B", and "person C" are given as an example of the agents, but the present embodiment obviously is not limited thereto, and may also include dialogue processing sections that realize dialogue specialized for each of an even greater number of agents. The basic dialogue processing section 31 realizes general-purpose dialogue that is not specialized for each agent.

Herein, a basic configuration common to the basic dialogue processing section 31, the character A dialogue processing section 32, the person B dialogue processing section 33, and the person C dialogue processing section 34 will be described with reference to FIG. 4.

Figure 4:
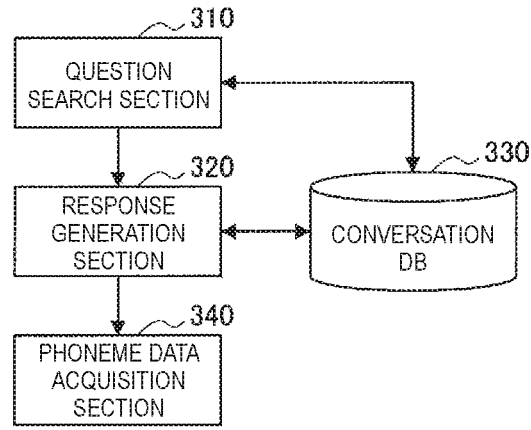
FIG. 4 is a diagram illustrating an exemplary configuration of a dialogue processing section according to the present embodiment.

FIG. 4 is a diagram illustrating an exemplary configuration of a dialogue processing section 300 according to the present embodiment. As illustrated in FIG. 4, the dialogue processing section 300 includes a question search section 310, a response generation section 320, a phoneme data acquisition section 340, and a conversation DB 330. In the conversation DB 330, conversation data containing pairs of question data and response data is saved. In a dialogue processing section specialized for an agent, conversation data specialized for the agent is saved in such a conversation DB 330, whereas in the general-purpose dialogue processing section, general-purpose conversation data (that is, basic conversation data) not specialized for an agent is saved in such a conversation DB 330.

The question search section 310 searches the conversation DB 330 for question data matching a question obtained by recognizing question speech (one example of uttered speech) of the user output from the speech agent I/F 20 and converting the speech to text. The response generation section 320 extracts, from the conversation DB 330, response data saved in association with the question data returned by the search by the question search section 310, and generates response data. The phoneme data acquisition section 340 acquires, from the phoneme storage section 40 of the corresponding agent, phoneme data for converting the response generated by the response generation section 320 to speech. For example, in the case of the character A dialogue processing section 32, phoneme data for playing back the response data in the voice of the character A is acquired from a character A phoneme DB 42. Subsequently, the dialogue processing section 300 outputs the generated response data and the acquired phoneme data to the speech agent I/F 20.

The phoneme storage section 40 stores a phoneme database for generating speech for each agent. The phoneme storage section 40 may be realized by read-only memory (ROM) and random access memory (RAM). In the example illustrated in FIG. 3, a basic phoneme DB 41, a character A phoneme DB 42, a person B phoneme DB 43, and a person C phoneme DB 44 are stored. In each phoneme DB, sub-phonetic segments and their control information, namely a prosody model, for example, are stored as phoneme data.

The conversation DB generation section 50 includes a function of generating the conversation DB 330 of the dialogue processing section 300. For example, the conversation DB generation section 50 collects anticipated question data, and after collecting response data corresponding to each question, saves pairs of question data and response data. Subsequently, when a predetermined amount of conversation data (pairs of question data and response data, for example 100 pairs) is collected, the conversation DB generation section 50 registers the conversation data in the conversation DB 330 as a conversation data set of an agent.

The phoneme DB generation section 60 includes a function of generating the phoneme DB stored in the phoneme storage section 40. For example, the phoneme DB generation section 60 analyzes speech information from reading predetermined text aloud, decomposes the speech information into sub-phonetic segments and their control information, namely a prosody model, and when a predetermined amount or greater of speech information is collected, the phoneme DB generation section 60 executes a process of registering the speech information in the phoneme DB as phoneme data.

The advertisement insertion processing section 70 includes a function of inserting advertisement information into the dialogue of the agent. The advertisement information to insert may be extracted from the advertisement DB 72. In the advertisement DB 72, advertisement information (for example, advertisement content such as text, images, and speech, and information such as the advertiser, the advertisement period, and the advertising target) requested from the providing side (vendor, supplier), such as a corporation, is registered.

The feedback acquisition processing section 80 includes a function for inserting questions for acquiring feedback into the dialogue of the agent, and obtaining feedback from the user.

The above specifically describes a configuration of the agent server 2 according to the present embodiment. Note that the configuration of the agent server 2 according to the present embodiment is not limited to the example illustrated in FIG. 3. For example, each configuration included in the agent server 2 may also be configured as another server on a respective network.

Next, specific operating processes of the communication control system according to the present embodiment will be described with reference to FIGS. 5 to 14.

3. SYSTEM OPERATING PROCESSES

<3-1. Conversation Data Registration Process>

Figure 5:
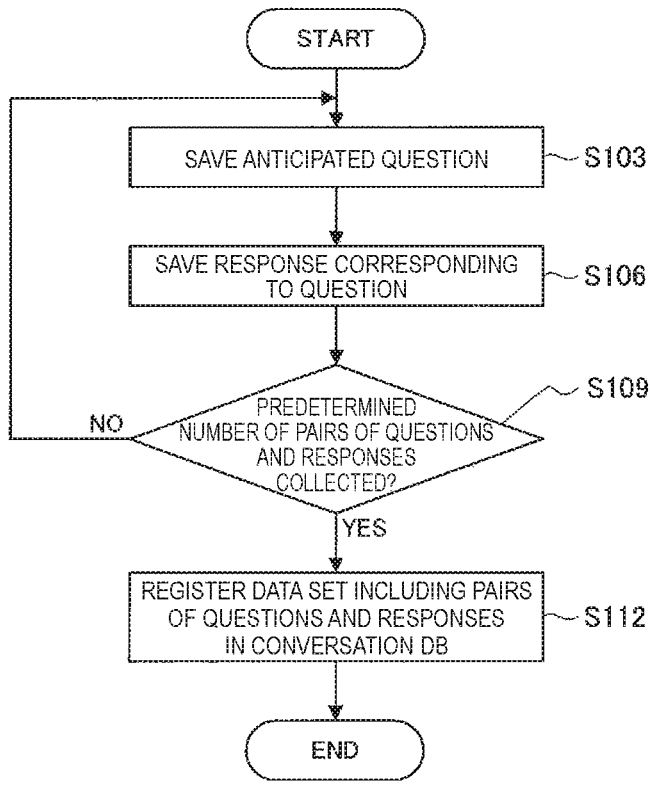
FIG. 5 is a flowchart illustrating a process of generating a conversation DB according to the present embodiment.

FIG. 5 is a flowchart illustrating a process of generating the conversation DB 330 according to the present embodiment. As illustrated in FIG. 5, first, the conversation DB generation section 50 saves an anticipated question (S103).

Next, the conversation DB generation section 50 saves a response corresponding to (paired with) the question (step S106).

Next, the conversation DB generation section 50 determines whether or not a predetermined number of pairs of questions and responses (also designated conversation data) have been collected (step S109).

Subsequently, in the case in which the predetermined number of pairs of questions and conversations have been collected (step S109/Yes), the conversation DB generation section 50 registers a data set including many pairs of questions and responses in the conversation DB 330 (step S112). As an example of pairs of questions and responses, something like the following is anticipated, for example.

Examples of Pairs of Questions and Responses
Pair 1
Question: Good morning.
Response: How are you feeling today?
Pair 2
Question: How's the weather today?
Response: The weather today is OO.

Such pairs may be registered in the conversation DB 330 as conversation data.

<3-2. Phoneme DB Generation Process>

Figure 6:
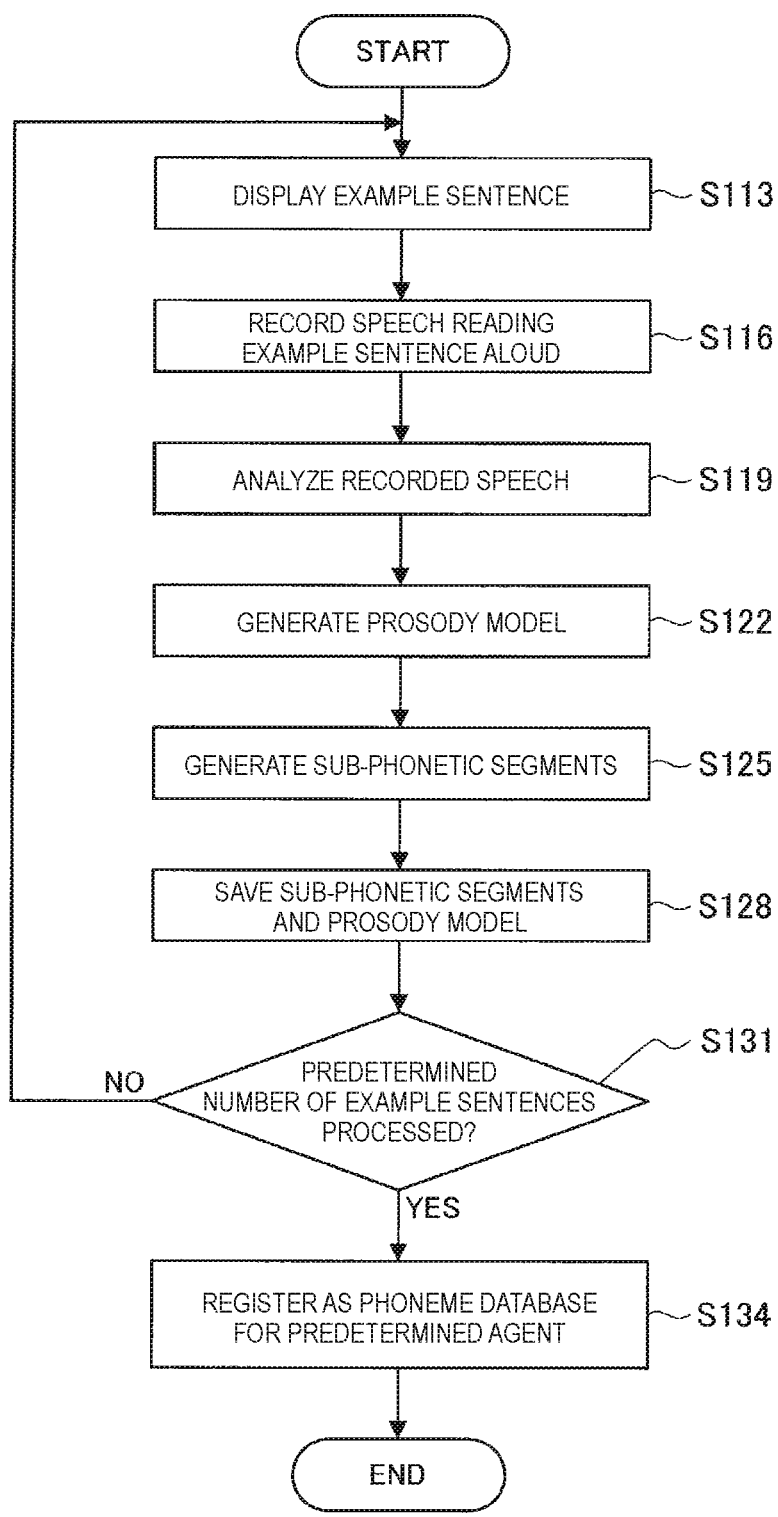
FIG. 6 is a flowchart illustrating a process of generating a phoneme DB according to the present embodiment.

FIG. 6 is a flowchart illustrating a process of generating the phoneme DB according to the present embodiment. As illustrated in FIG. 6, first, the phoneme DB generation section 60 displays an example sentence (step S113). The display of the example sentence displays an example sentence needed for phoneme data generation on the display of an information processing terminal not illustrated, for example.

Next, the phoneme DB generation section 60 records speech of the example sentence being read aloud (step S116), and analyzes the recorded speech (step S119). For example, speech information of reading aloud by a person in charge of the voice of the agent is collected by a microphone of the information processing terminal, and the phoneme DB generation section 60 receives and stores the speech information, and additionally executes speech analysis.

Next, the phoneme DB generation section 60 generates a prosody model on the basis of the speech information (step S122). A prosody model is an extraction of prosody parameters which indicate the prosodic characteristics (such as the pitch of sound, the loudness of sound, and the speed of utterance, for example) of speech, and is different for every person.

Next, the phoneme DB generation section 60 generates sub-phonetic segments (phoneme data) on the basis of the speech information (step S125).

After that, the phoneme DB generation section 60 saves the prosody model and the sub-phonetic segments (step S128).

Next, the phoneme DB generation section 60 determines whether or not a predetermined number of prosody models and sub-phonetic segments have been collected (step S131).

Additionally, in the case in which the predetermined number of prosody models and sub-phonetic segments have been collected (step S131/Yes), the phoneme DB generation section 60 registers the prosody models and the sub-phonetic segments in the phoneme storage section 40 as a phoneme database for a predetermined agent (step S134).

<3-3. Dialogue Control Process>

Figure 7:
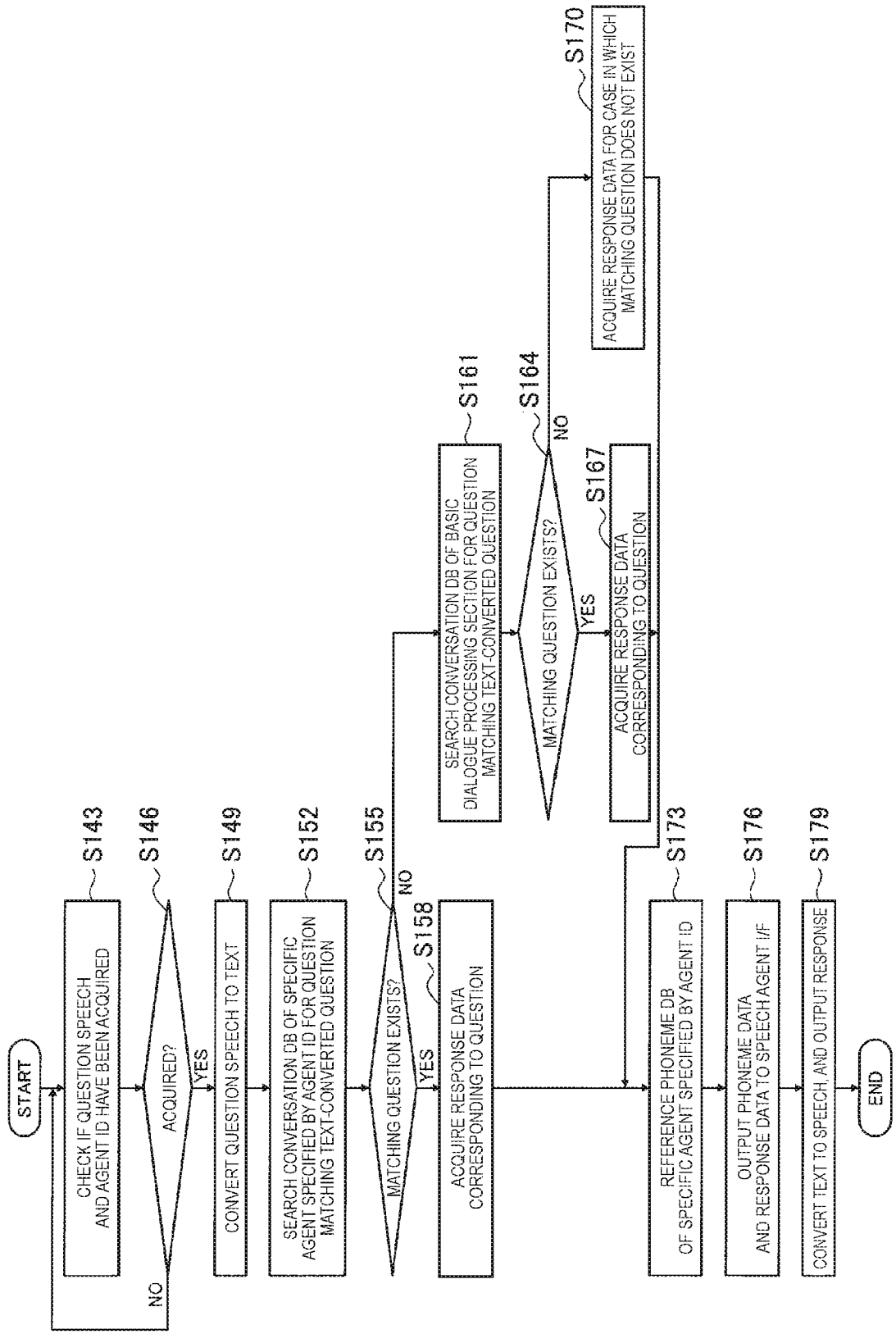
FIG. 7 is a flowchart illustrating a dialogue control process according to the present embodiment.

FIG. 7 is a flowchart illustrating a dialogue control process according to the present embodiment. As illustrated in FIG. 7, first, the speech agent I/F 20 checks whether or not question speech of the user and an agent ID have been acquired (step S143). The agent ID is identification information indicating a specific agent, such as character A, person B, or person C. The user is able to purchase the phoneme data for each agent, and the ID of the purchased agent is saved in the client terminal 1 during the purchase process, for example.

Next, if question speech of the user and an agent ID is acquired (step S146/Yes), the speech agent I/F 20 performs speech recognition and text conversion on the question speech (step S149). The speech agent I/F 20 outputs the text-converted question to the dialogue processing section of the specific agent specified by the agent ID. For example, in the case of "agent ID: character A", the speech agent I/F 20 outputs the text-converted question to the character A dialogue processing section 32.

After that, the dialogue processing section 30 searches the conversation DB of the specific agent specified by the agent ID for a question that matches the text-converted question (step S152).

Next, in the case in which a matching question exists (step S155/Yes), the character A dialogue processing section 32 acquires response data corresponding to (saved as a pair with) the question from the conversation DB of the specific agent (step S158).

On the other hand, in the case in which a matching question does not exist (step S155/No), the conversation DB of the basic dialogue processing section 31 is searched for a question that matches the text-converted question (step S161).

In the case in which a matching question exists (step S161/Yes), the basic dialogue processing section 31 acquires response data corresponding to (saved as a pair with) the question from the basic dialogue processing section 31 (step S167).

On the other hand, in the case in which a matching question does not exist (step S164/No), the basic dialogue processing section 31 acquires response data (for example, a response such as "I don't understand the question") for the case of in which a matching question does not exist (step S170).

After that, the phoneme DB (herein, the character A phoneme DB 42) of the specific agent specified by the agent ID is referenced by the character A dialogue processing section 32, and phoneme data of the character A for generating speech of the response data is acquired (step S173).

Next, the acquired phoneme data and the response data are output to the speech agent I/F 20 (step S176).

Subsequently, the speech agent I/F 20 uses the phoneme data to convert the response data (text) into speech (speech synthesis), and transmits the speech to the client terminal 1 (step S179). In the client terminal 1, the response is played back in the voice of the character A.

<3-4. Conversation DB Update Process>

Next, a process of updating the conversation DB 330 of each dialogue processing section 300 will be described. In the present embodiment, it is possible to make the conversation DB 330 grow through conversation with the user.

Figure 8:
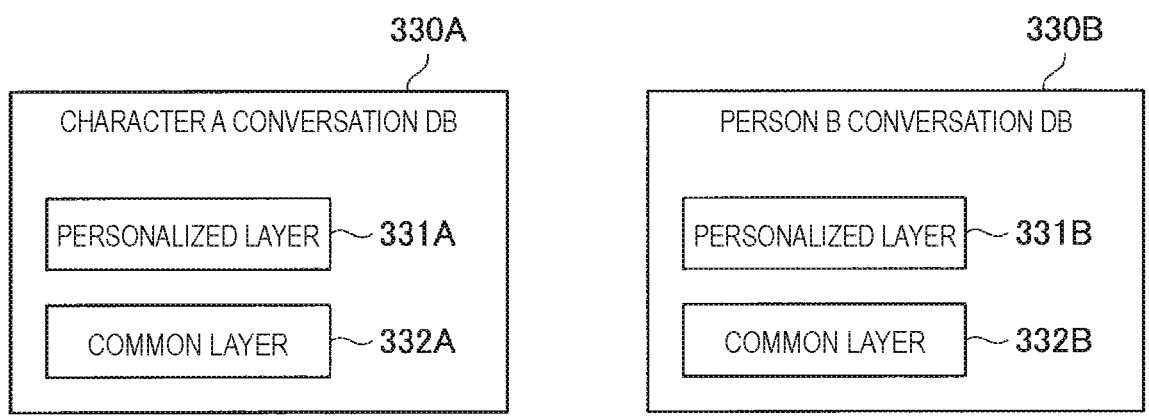
FIG. 8 is a diagram explaining an exemplary data configuration of a conversation DB according to the present embodiment.

First, an exemplary data configuration of the conversation DB 330 will described in further detail with reference to FIG. 8. FIG. 8 is a diagram explaining an exemplary data configuration of the conversation DB 330 according to the present embodiment. As illustrated in FIG. 8, each conversation DB 330 includes two layers, namely a personalized layer 331 and a common layer 332. For example, in the case of the character A conversation DB 330A, conversation data reflecting the personality and characteristics of the character A is stored in the common layer 332A. Meanwhile, in the personalized layer 331A, conversation data that has been customized towards the user through conversation with the user is stored. In other words, although the character A phoneme DB 42 and the character A dialogue processing section 32 are provided (sold) to users as a set, a certain user X and a certain user Y initially engage in dialogue with the same character A (the conversation data stored in the common layer 332A is used), but as the users continue to engage in dialogue, conversation data customized towards each user is accumulated in the personalized layer 331A for each user. With this arrangement, it becomes possible to provide dialogue with the character A that corresponds to what each of the user X and the user Y likes.

Also, even in the case in which the agent "person B" is average persons of different generations without a specific personality like the character A, conversation data may be customized towards the user. In other words, in the case in which "person B" is "a person in his or her 20s", for example, average 20s conversation data is stored in the common layer 332B, and conversation data customized by continued dialogue with the user is stored in the personalized layer 331B for each user. Additionally, the user is also able to select and purchase preferred phoneme data, such as "male", "female", "high-pitched voice", or "low-pitched voice", as the voice of the person B from the person B phoneme DB 43.

Figure 9:
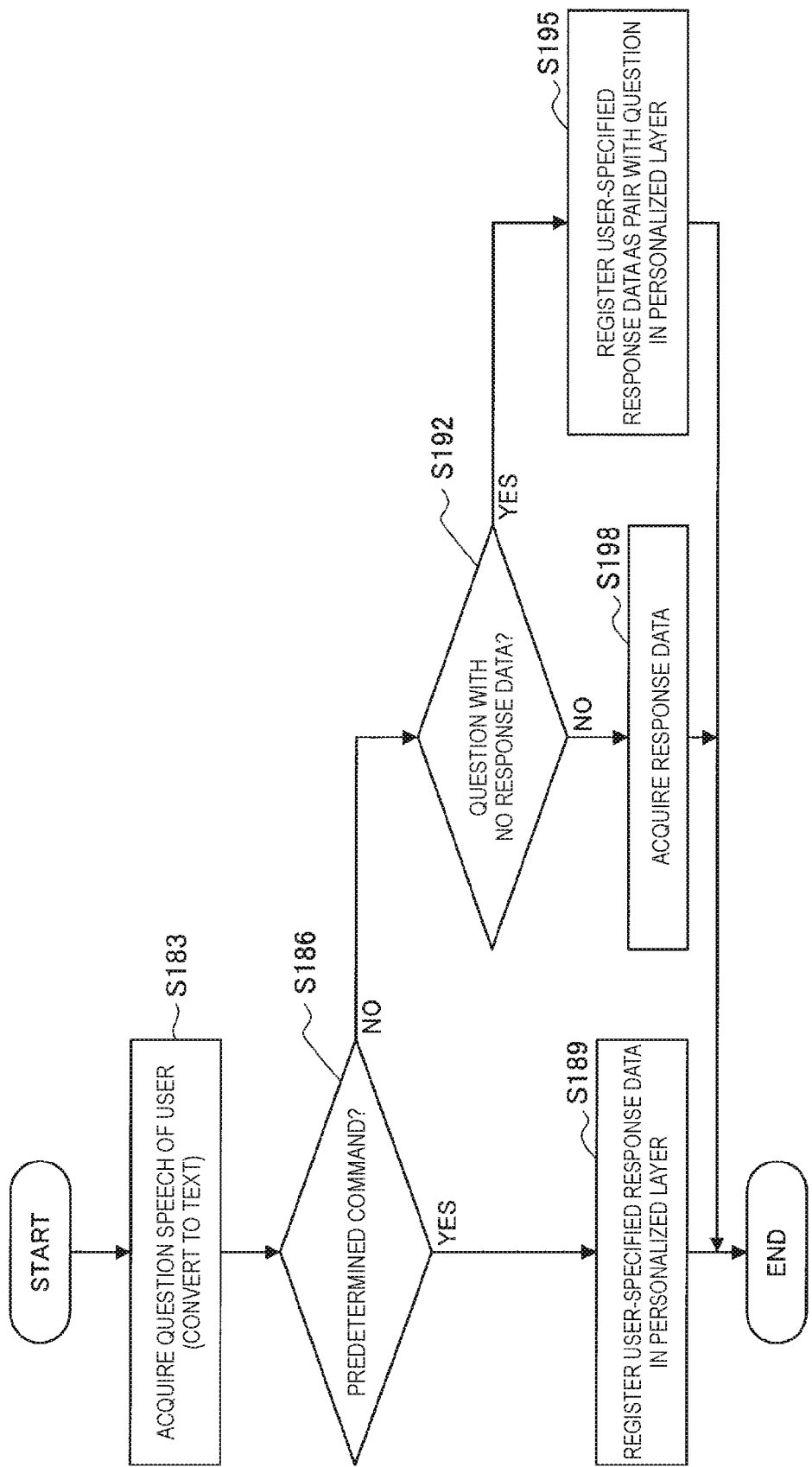
FIG. 9 is a flowchart illustrating a process of updating a conversation DB according to the present embodiment.

A specific process when executing such customization of the conversation DB 330 will be described with reference to FIG. 9. FIG. 9 is a flowchart illustrating a process of updating the conversation DB 330 according to the present embodiment.

As illustrated in FIG. 9, first, the speech agent I/F 20 acquires (receives) question speech of the user from the client terminal 1, and converts the question speech to text by speech recognition (step S183). The text-converted data (question data) is output to the dialogue processing section (herein, the character A dialogue processing section 32, for example) of the specific agent specified by the agent ID.

Next, the character A dialogue processing section 32 determines whether or not the question data is a predetermined command (step S186).

After that, in the case of the predetermined command (step S186/Yes), the character A dialogue processing section 32 registers user-specified response data as a pair with the question data in the personalized layer 331A of the conversation DB 330A (step S189). The predetermined command may be a word such as "NG" or "Settings", for example. For example, by a flow of conversation like the following, the conversation DB of the character A may be customized.

User: "Good morning"
Character A: "Good morning"
User: "NG. Say cheer up and do your best"
Character A: "Cheer up and do your best"

In the above flow of conversation, "NG" is the predetermined command, and after "NG" is uttered by the user, the character A dialogue processing section 32 registers the user-specified response data "Cheer up and do your best" as a pair with the question data "Good morning" in the personalized layer 331A of the conversation DB 330A.

On the other hand, in the case of not the predetermined command (step S186/No), the character A dialogue processing section 32 searches the character A conversation DB 330A for response data stored as a pair with the question data. In the case in which response data stored as a pair with the question data is not stored in the character A conversation DB 330A, that is, in the case in which the user's question is a question with no response (step S192/Yes), the character A dialogue processing section 32 registers a user-specified response in the personalized layer 331A as a pair with the question (step S195). For example, by a flow of conversation like the following, the conversation DB of the character A may be customized.

User: "How's it going?"
Character A: "I don't understand the question" (example response data for the case in which a corresponding response does not exist)
User: "If I ask 'How's it going?', say 'I'm great today as usual'"
Character A: "I'm great today as usual"

In the above flow of conversation, since there is no response data stored as a pair with "How's it going?", example response data for the case in which a corresponding response does not exist, namely "I don't understand the question", is acquired by the character A dialogue processing section 32, output together with the phoneme data of the corresponding character A to the speech agent I/F 20, and played back by the client terminal 1. After that, if the user-specified response "I'm great today as usual" is input, the character A dialogue processing section 32 registers the response as a pair with the question data "How's it going?" in the personalized layer 331A.

Note that in the case of a question having a response (step S192/No), the character A dialogue processing section 32 acquires and outputs the response data together with the phoneme data of the corresponding character A to the speech agent I/F 20, and the response is played back in the voice of the character A by the client terminal 1 (step S198).

Figure 10:
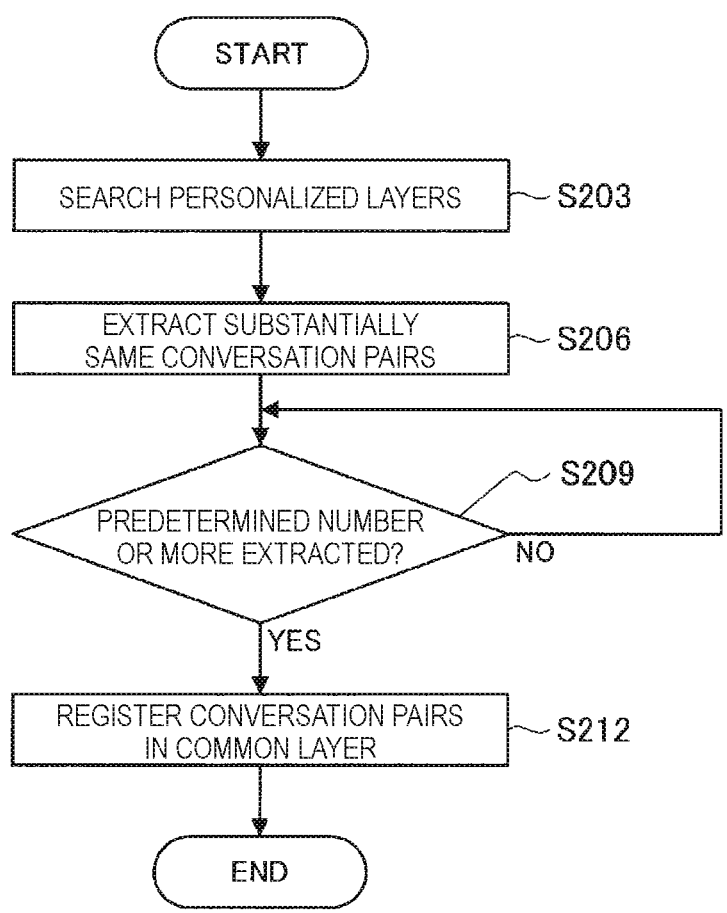
FIG. 10 is a flowchart illustrating a process of moving conversation data from a personalized layer to a common layer according to the present embodiment.

Next, the movement of conversation data from the personalized layer to the common layer will be described with reference to FIG. 10. FIG. 10 is a flowchart illustrating a process of moving conversation data from a personalized layer to a common layer according to the present embodiment. Herein, a process of moving conversation data from the personalized layer 331A to the common layer 332A of the character A dialogue processing section 32 will be described as an example.

As illustrated in FIG. 10, first, the character A dialogue processing section 32 periodically searches the personalized layer 331A for each user (step S203), and extracts conversation pairs (pairs of question data and response data) with substantially the same content (step S206). As conversation pairs with substantially the same content, for example, the pair of the question "How's it going?" and the response "I'm great today as usual!", and the pair of the question "How are you?" and the response "I'm great today as usual!", differ only in the politeness of the question, and may be judged to be conversation pairs with substantially the same content.

Next, in the case in which a predetermined number or more of conversation pairs have been extracted from the personalized layer 331A for each user (step S209/Yes), the character A dialogue processing section 32 registers the conversation pairs in the (in each user's) common layer 332A (step S212).

In this way, by moving conversation pairs having substantially the same content in the personalized layer 331 for each user to the common layer 332, it becomes possible to make the common layer 332 grow (expand the conversation pairs).

Figure 11:
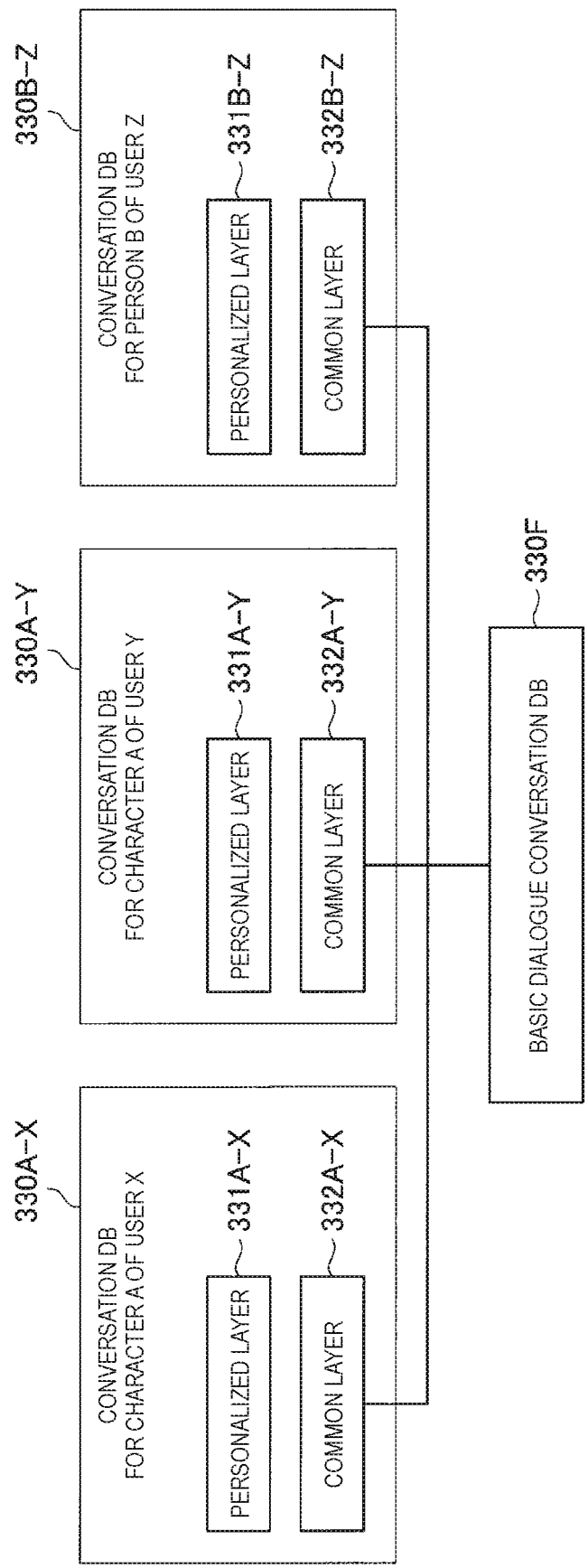
FIG. 11 is a diagram explaining the moving of conversation data to a basic dialogue conversation DB according to the present embodiment.

Additionally, in the present embodiment, it is also possible to cause a conversation DB for basic dialogue to grow by moving conversation data from the conversation DB (specifically, the common layer) of a specific agent to the conversation DB for basic dialogue. FIG. 11 is a diagram explaining the moving of conversation data to the basic dialogue conversation DB 330F according to the present embodiment. For example, in the case in which the user X and the user Y have each selected (purchased) the agent "character A", while a user Z has selected (purchased) the agent "person B", as illustrated in FIG. 11, a conversation DB 330A-X for the character A of user X, a conversation DB 330A-Y for the character A of user Y, and a conversation DB 330B-Z for the person B of user Z may exist in the dialogue processing section 30. In this case, in each personalized layer 331A-X, 331A-Y, and 331B-Z, individual (customized) conversation pairs are registered according to the dialogue with each of the user X, the user Y, and the user Z (see FIG. 9). Next, if there are a predetermined number of conversation pairs which are substantially the same in the personalized layers 331A-X and 331A-Y of the same agent, the conversation pairs are registered in each of the common layers 332A-X and 332A-Y for each user (see FIG. 10).

Figure 12:
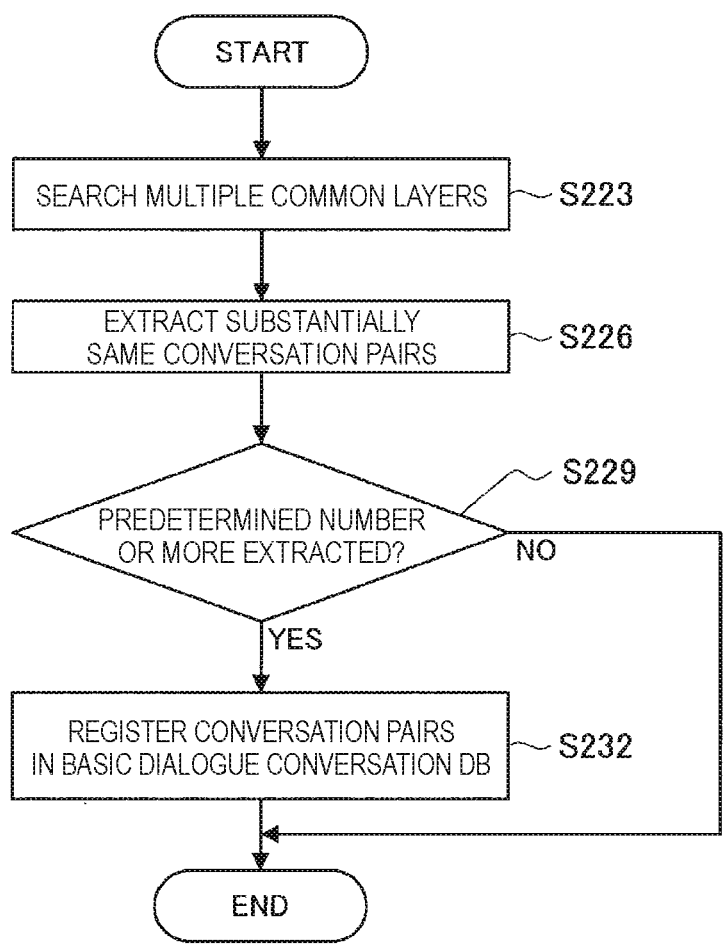
FIG. 12 is a flowchart illustrating a process of moving conversation data to the basic dialogue DB according to the present embodiment.

Additionally, in the case in which a predetermined number or more of conversation pairs which are substantially the same is extracted from the common layers 332A-X, 332A-Y, and 332B-Z of multiple agents (which may also include different agents), the dialogue processing section 30 moves the conversation pairs to the higher-layer basic dialogue conversation DB 330F. The basic dialogue conversation DB 330F is a conversation DB included in the basic dialogue processing section 31. With this arrangement, it becomes possible to make the basic dialogue conversation DB 330F grow (expand the conversation pairs). Such a data movement process will be described specifically with reference to FIG. 12. FIG. 12 is a flowchart illustrating a process of moving conversation data to the basic dialogue conversation DB 330F according to the present embodiment.

As illustrated in FIG. 12, first, the dialogue processing section 30 periodically searches the common layers 332 of multiple conversation DBs 330 (step S223), and extracts conversation pairs which are substantially the same (step S226).

Next, in the case in which a predetermined number or more conversation pairs which are substantially the same have been extracted from the multiple common layers 332 (step S229/Yes), the dialogue processing section 30 registers the conversation pairs in the basic dialogue conversation DB 330F (step S232).

In this way, by moving conversation pairs with substantially the same content in the common layer 332 of the conversation DB 330 for multiple agents to the basic dialogue conversation DB 330F, it becomes possible to make the basic dialogue conversation DB 330F grow (expand the conversation pairs).

<3-5. Advertisement Output Process>

Next, the process of inserting advertisement information by the advertisement insertion processing section 70 will be described with reference to FIGS. 13 and 14. In the present embodiment, by the advertisement insertion processing section 70, it is possible to insert advertisement information stored in the advertisement DB 72 into an utterance of an agent. Advertisement information may be registered in the advertisement DB 72 in advance. FIG. 13 is a diagram illustrating an example of advertisement information registered in the advertisement DB 72 according to the present embodiment.

As illustrated in FIG. 13, advertisement information 621 includes an agent ID, a question, advertisement content, a condition, and a probability. The agent ID specifies the agent to utter the advertisement content, the question specifies the question of the user that acts as a trigger for inserting the advertisement content, and the advertisement content is the advertisement sentence to insert into the dialogue of the agent. Also, the condition is a condition on inserting the advertisement content, and the probability indicates the probability of inserting the advertisement content. For example, in the example illustrated on the first row of FIG. 13, in the case in which the word "chocolate" is included in a question from a user who is 30 years old or less in a dialogue with the agent "character A", advertisement content stating "The new chocolate on sale from BB Co. contains a lot of milk and is delicious" is inserted into the response. Also, since the user might feel annoyed if the advertisement content is inserted every time the triggering question is uttered, in the present embodiment, the probability of inserting the advertisement may also be set. Such a probability may be decided according to the advertisement fee. For example, as the advertisement fee becomes higher, a higher probability is set.

Such a process of inserting advertisement content will be described specifically with reference to FIG. 14. FIG. 14 is a flowchart illustrating the process of inserting advertisement content according to the present embodiment.

Figure 14:
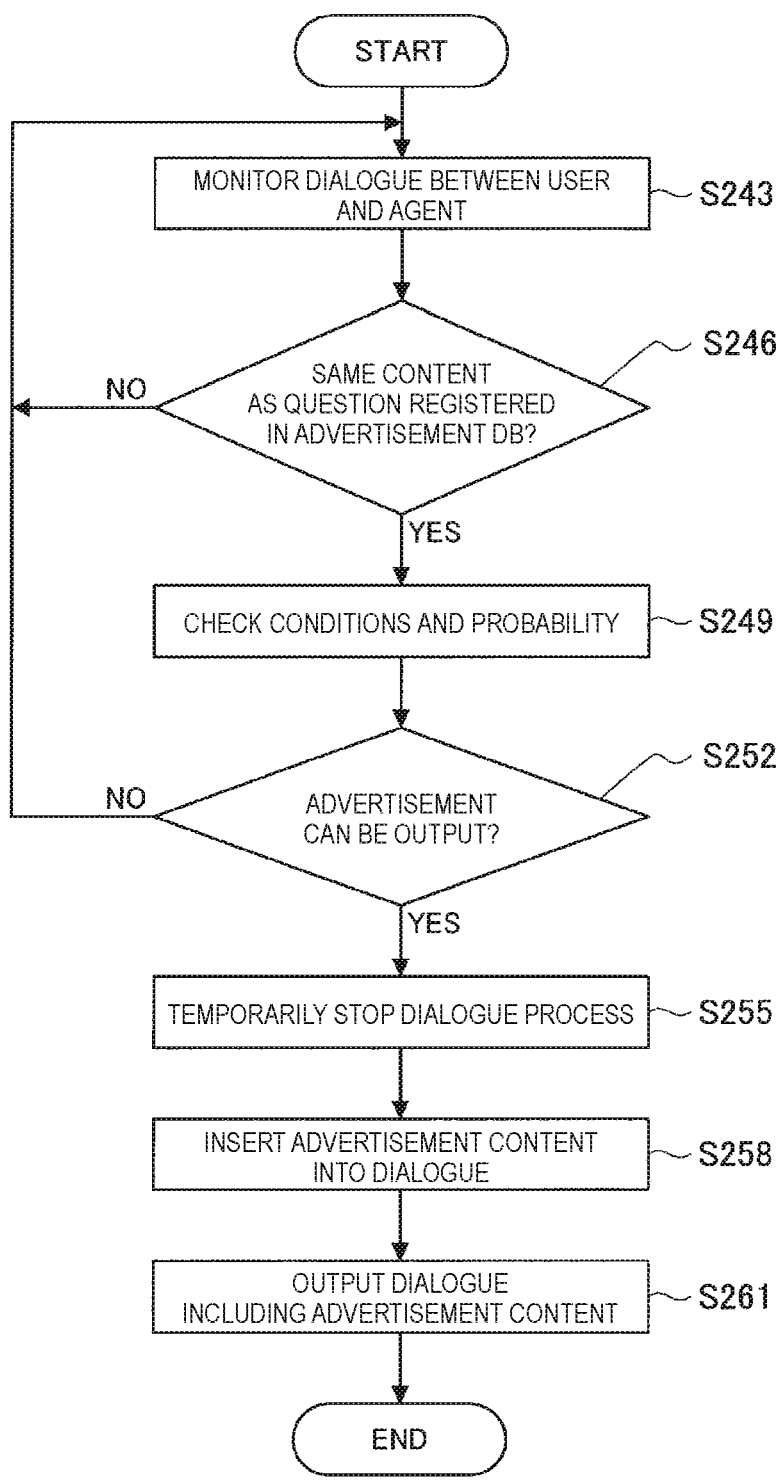
FIG. 14 is a flowchart illustrating a process of inserting advertisement content according to the present embodiment.

As illustrated in FIG. 14, first, the advertisement insertion processing section 70 monitors the dialogue (specifically, the dialogue process by the dialogue processing section 30) between the user and the agent (step S243).

Next, the advertisement insertion processing section 70 determines whether or not a question with the same content as a question registered in the advertisement DB 72 has appeared in the dialogue between the user and the agent (step S246).

After that, in the case in which a question with the same content has appeared (step S246/Yes), the advertisement insertion processing section 70 checks the condition and probability of advertisement insertion associated with the corresponding question (step S249).

Subsequently, on the basis of the condition and the probability, the advertisement insertion processing section 70 determines whether or not the advertisement can be output (step S252).

Next, in the case in which the advertisement can be output (step S252/Yes), the advertisement insertion processing section 70 temporarily stops the dialogue process by the dialogue processing section 30 (step S255), and inserts the advertisement content into the dialogue (step S258). Specifically, the advertisement content is inserted into a response of the agent with respect to the question of the user, for example.

Additionally, dialogue (conversation data) including the advertisement content is output from the dialogue processing section 30 to the speech agent I/F 20, transmitted from the speech agent I/F 20 to the client terminal 1, and played back in the voice of the agent (step S261). Specifically, advertisement content may be presented to the user as an utterance of the character A through a conversation like the following, for example.

User: "Good morning"
Character A: "Good morning! How are you feeling today?"
User: "I'm great. I want to eat something delicious"
Character A: "They say the barbecue at CC is delicious"

In the above conversation, first, with respect to the user question "Good morning", the corresponding response found in the conversation DB of the character A, namely "Good morning! How are you feeling today?" is output as speech. After that, since the user question "I'm great. I want to eat something delicious" includes the question "I want to eat something delicious" that acts as a trigger for advertisement insertion (refer to the second row of FIG. 13), the advertisement insertion processing section 70 executes the advertisement insertion process, and a response stating the advertisement content "They say the barbecue at CC is delicious" is output in the voice of the character A.

The above describes a conversation data registration process, a phoneme DB generation process, a dialogue control process, a conversation DB update process, and an advertisement insertion process as basic operating processes of the communication control system according to the present embodiment.

Note that the dialogue control process according to the present embodiment is not limited to the example described above. The dialogue processing section 30 according to the present embodiment is also capable of executing a process of switching the agent depending on a user emotion. Hereinafter, such a case will be described specifically with reference to FIGS. 15 to 19.

4. DIALOGUE CONTROL PROCESS

<4-1. Configuration>

First, the configuration of a dialogue processing section 30a that may execute an agent (that is, an agent program) switching process according to a user information in the dialogue process according to the present embodiment will be described with reference to FIG. 15.

Figure 15:
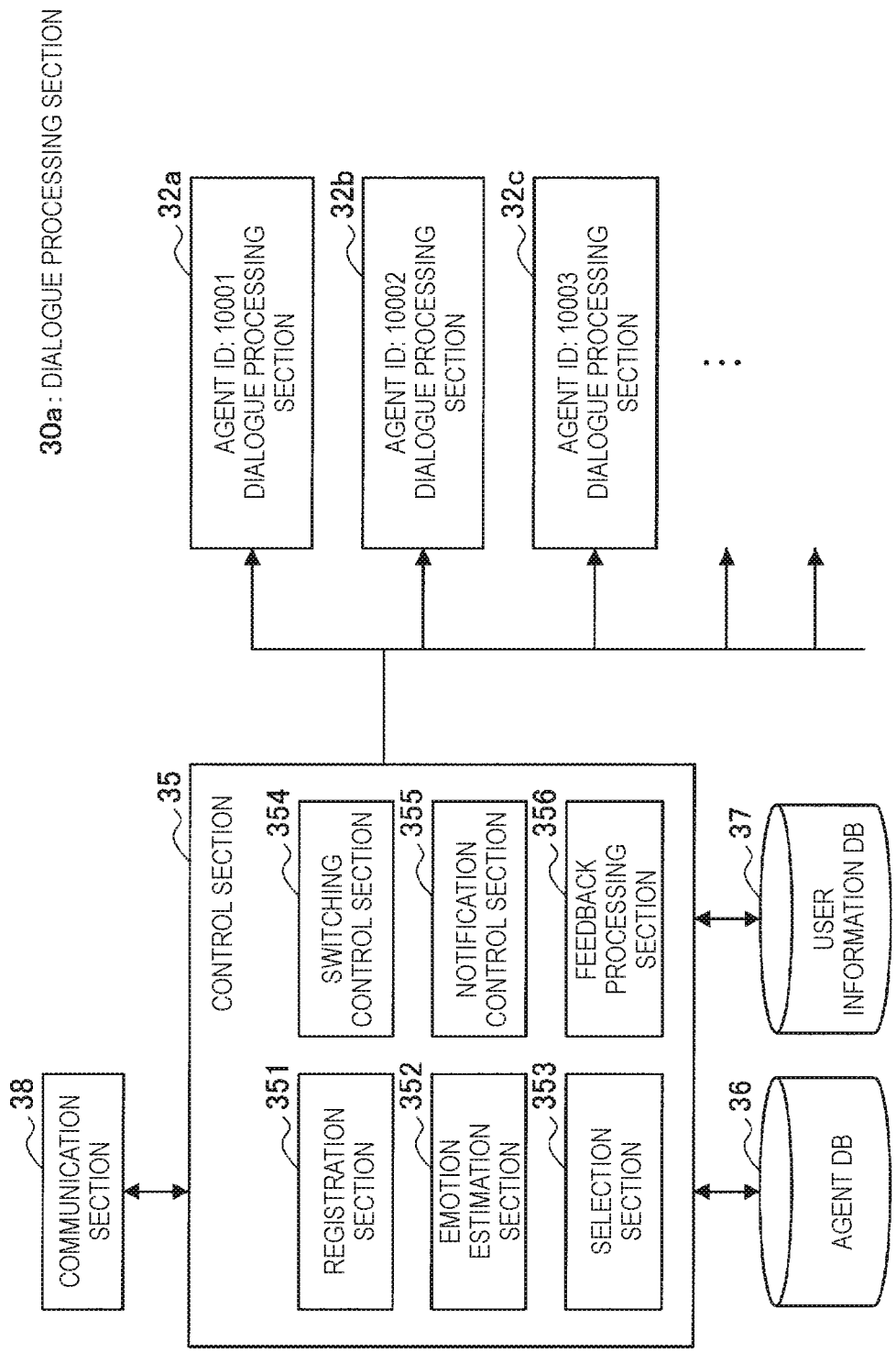
FIG. 15 is a diagram illustrating an exemplary configuration of a dialogue processing section according to the present embodiment.

FIG. 15 is a diagram illustrating an exemplary configuration of the dialogue processing section 30a according to the present embodiment. As illustrated in FIG. 15, the dialogue processing section 30a includes dialogue processing sections 32a to 32c for each agent, a control section 35, an agent DB 36, a user information DB 37, and a communication section 38.

The dialogue processing sections 32a to 32c for each agent include a function of performing automatic dialogue with the user by each agent, and providing various corresponding agent services (for example, providing recommendations about the real world, content on the Internet, or the like, providing information such as news, weather forecasts, and the like, giving directions, and the like). The dialogue with the user itself may also be included in the agent services. The dialogue processing sections 32a to 32c include the question search section 310, the response generation section 320, the conversation DB 330, and the phoneme data acquisition section 340 as illustrated in FIG. 4, and engage in dialogue with the user through the speech agent I/F 20. Specifically, the dialogue processing sections 32a to 32c reference the conversation DB 330 to generate responses according to the uttered speech of the user, and acquire the phoneme data of the corresponding agent with the phoneme data acquisition section 340. Subsequently, the response and the phoneme data is output to the speech agent I/F 20, the response is converted to speech in the speech agent I/F 20, transmitted to the client terminal 1, and output as speech from the client terminal 1 as an utterance of the predetermined agent. The conversation DB 330 stores response data in pairs with question data according to the personality of each agent. Also, in the dialogue processing sections 32a to 32c, information (agent image information) for displaying each agent may be stored.

The control section 35 controls each component of the dialogue processing section 30a. For example, the control section 35 provides automatic dialogue by the agent. More specifically, the control section 35 functions as a registration section 351, an emotion estimation section 352, a selection section 353, a switching control section 354, a notification control section 355, and a feedback processing section 356.

The registration section 351 includes a function of storing agent information input by a business or the like into the agent DB 36. As the agent information, the business or the like inputs an agent ID, an agent name, information about emotions to apply to the agent (that is, information indicating which user emotions and psychological states the agent is suited to), attributes of the target user, attributes of the agent, and the like. Note that the phoneme data of the agent is stored in the phoneme storage section 40, the conversation data set is stored in the dialogue processing section of each agent (such as the dialogue processing sections 32a to 32c), and these are associated by the agent ID.

Herein, an example of the data configuration of the agent information stored in the agent DB 36 is illustrated in Table 1 below.

TABLE 1

| Agent ID | Agent name | Applicable emotion | Target user attribute | Agent attribute |
|---|---|---|---|---|
| 10001 | Soothing woman 1 | Sad | Man, 30s | Consoling, Beautiful |
| 10002 | Soothing woman 2 | Sad | Man, 30s | Consoling, Maid, Cute |
| 11001 | Soothing man 1 | Sad | Woman, 50s | Good listener, Host |
| 20001 | Older sister 1 | Happy | Man, 20s+ | Self-confident, Intimidating |
| 21002 | Older sister 2 | Happy | Man | Praising, Kind |

The agent attributes indicate the characteristics of the character, such as the agent's personality and appearance. Also, there may be multiple agent attributes for a single agent. In the case in which multiple agent attributes are associated, a weighting parameter may be applied to each attribute and taken into account when selecting an agent by the selection section 353 described later.

The emotion estimation section 352 includes a function of estimating the emotion or psychological state of the user. For example, the emotion estimation section 352 estimates the emotion or psychological state of the user on the basis of biological information (such as pulse, heartbeat, cardiac sound, blood pressure, respiration, body temperature, perspiration, brain waves, myoelectric potential, and the like), speech information (such as intonation of the voice), a captured image (a face image of the user, an image of the eye), sensing data about motions and actions, and the like of the user acquired from the client terminal 1 through the communication section 38. From a captured image, the facial expression of the user may be obtained by facial analysis. Motions and actions may be obtained by an acceleration sensor, a gyro sensor, a vibration sensor, a geomagnetic sensor, a direction sensor, a positioning sensor, and the like.

The selection section 353 includes a function of referencing the agent DB 36 and selecting the agent to apply, in accordance with the emotion of the user. The "emotion of the user" may be an emotion estimated by the emotion estimation section 352, or in the case in which emotion estimation is executed on the client terminal 1 side, an emotion transmitted from the client terminal 1 and acquired through the communication section 38.

In addition, the selection section 353 may also reference the user information DB 37, and select the agent to apply from among the agents owned by the user (for which the user possesses usage rights, specifically, already purchased, for example). Furthermore, the selection section 353 may make a selection while also accounting for the target user attributes and the agent attributes included in the agent information. Also, the selection section 353 may reference the user information DB 37, and select an agent while additionally accounting for user preference information (that is, what the user likes).

For example, if the user is feeling a "sad" emotion, the selection section 353 selects "Soothing woman 1" with the agent ID: 10001, "Soothing woman 2" with the agent ID: 10002, and "Soothing man 1" with the agent ID: 10003 which match by the applicable emotion "sad". In the case in which multiple agents are selected, the selection section 353 may select one optimal agent by additionally accounting for the target user attributes, the agent attributes, or the user preference information.

The switching control section 354 includes a function of controlling agent switching. Specifically, in the case in which an agent is selected by the selection section 353, the switching control section 354 controls the corresponding dialogue processing sections 32a to 32c to start dialogue by the selected agent. For example, in the case in which the agent with the agent ID: 10001 is selected, control is executed to start the dialogue process by the agent ID: 10001 dialogue processing section 32a (that is, dialogue with the user by the agent with the agent ID: 10001).

In addition, in the case in which the agent selected by the selection section 353 is an agent owned by the user (for which the user possesses usage rights, specifically, already purchased, for example), the switching control section 354 may control the switching to the agent.

Also, in the case in which, while the user is engaged in dialogue with another agent, a change of emotion is detected by the emotion estimation section 352, and a new agent is selected by the selection section 353 according to the emotion change, the switching control section 354 may also switch agents in the middle of the dialogue.

In the case in which the agent selected by the selection section 353 is not an agent owned by the user (that is, an agent which has not been purchased yet), the notification control section 355 transmits a notification recommending that the user purchase the agent to the client terminal 1 through the communication section 38. Whether or not the agent is owned by the user may be determined by referencing the user information stored in the user information DB 37. Herein, an example of the configuration of data stored in the user information DB 37 is illustrated in Table 2 below.

TABLE 2

| User ID | Owned agents (already purchased) | Preferred agent attributes | Preferred agent ID |
|---|---|---|---|
| a | 10002 | — | 10002 |
| b | 10001, 10002 | When sad: Consoling | — |
| c | 21002 | Woman, 30s | When happy: 21002<br>When sad: 11001 |
| d | 10001, 10002 | — | — |

As illustrated in Table 2, the user information includes the IDs of agents already owned by the user, and user preference information (specifically, preferred attributes and preferred agents, for example).

Preferred attributes are managed together with emotions or psychological states. For example, according to Table 2, the user b's preference for a "consoling" agent when sad is registered. Also, according to Table 2, the user a's preference for the agent with the agent ID 10002 for any emotion or psychological state is registered. This preference information may be registered by the feedback processing section 39 described next.

Note that in the example illustrated in Table 2, preferred attributes and preferred agent IDs are registered as the preference information, but the present embodiment is not limited thereto, and attributes or agent IDs which are not liked may also be registered.

Also, although not illustrated in Table 2, basic attributes about the user (such as age, gender, and address, for example) may also be stored. Also, the user information DB 37 may be linked to other DBs.

The feedback processing section 356 includes a function of acquiring a user evaluation with respect to an agent, and registering the user evaluation in the user information DB 37 as preference information. The feedback may be input manually (specifically, through text or speech, for example) by the user on the client terminal 1, or may be sensing data in which user reactions (emotions, psychological states) are detected automatically by various sensors. The various sensors are sensors which are communicable with the client terminal 1 (including sensors provided in the client terminal 1), and transmit detected sensing data to the client terminal 1. The sensing data is transmitted from the client terminal 1 to the agent server 2. The various sensors are anticipated to be biological sensors, a microphone, a camera, an acceleration sensor, a gyro sensor, a direction sensor, a positioning sensor, and the like, for example. The feedback of the user indicates whether the agent selected by the system side or the agent recommended for purchase is the agent that the user desired at the time, an agent matching the user's emotion or psychological state at the time, or the like.

Additionally, the feedback processing section 356 may also estimate the emotion or psychological state of the user on the basis of the received sensing data, and treat the estimation as the feedback.

The communication section 38 may transmit and receive data with respect to an external apparatus over a network. For example, the communication section 38 receives the sensor information and the user evaluation from the client terminal 1, and transmits the agent recommendation notification.

The above specifically describes the configuration of the dialogue processing section 30a according to the present embodiment. Note that the configuration of the dialogue processing section 30a according to the present embodiment is not limited to the example illustrated in FIG. 15, and for example, the emotion estimation section 352 may also be provided on the client terminal 1 side.

Next, operating processes according to the present embodiment will be described specifically with reference to FIGS. 16 to 19.

<4-2. Operating Processes>

(4-2-1. Agent Switching Control Process)

Figure 16:
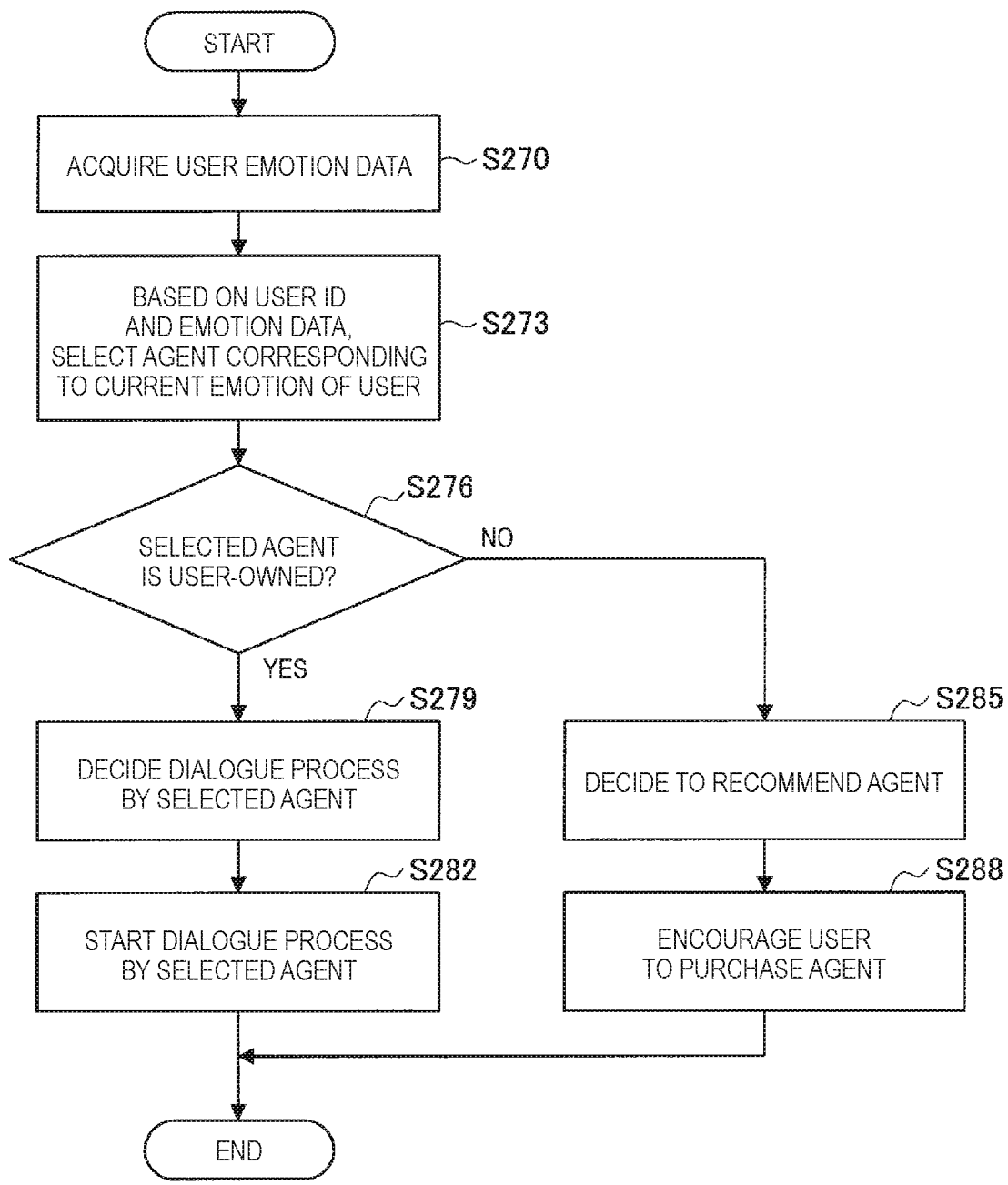
FIG. 16 is a flowchart illustrating an agent switching control process according to the present embodiment.

FIG. 16 is a flowchart illustrating an agent switching control process according to the present embodiment. As illustrated in FIG. 16, first, the dialogue processing section 30a acquires user emotion data (step S270). The user emotion data is estimated by the emotion estimation section 352 on the basis of sensing data received from the client terminal 1 through the communication section 38, for example. As described above, the sensing data is anticipated to be biological information detected by various biological sensors, facial expression information, speech information, action information, and the like, for example. Also, the user emotion data may be estimated on the basis of sensor data in the client terminal 1, and transmitted to the agent server 2.

After that, the selection section 353 of the dialogue processing section 30a selects an agent corresponding to the current emotion of the user, on the basis of the user ID and the emotion data (step S273). For example, the dialogue processing section 30a references the agent information stored in the agent DB 36 as illustrated in Table 1, and selects an agent corresponding to the current emotion of the user from the "applicable emotion" of each agent. At this time, the dialogue processing section 30a may also reference the user information stored in the user information DB 37 as illustrated in Table 2, and select an agent while also accounting for user preferences.

Next, the dialogue processing section 30a determines whether or not the selected agent is user-owned (step S276). Specifically, the dialogue processing section 30a references the user information stored in the user information DB 37 as illustrated in Table 2, and determines whether or not the selected agent is user-owned (already purchased by the user).

After that, in the case of a user-owned agent (step S276/Yes), the switching control section 354 decides the dialogue process with the selected corresponding agent (step S279), and controls the starting of the dialogue process with the agent (step S282). For example, in the case in which the agent with the agent ID: 10001 is selected and is user-owned, the switching control section 354 controls the agent ID: 10001 dialogue processing section 32a to start the dialogue process.

On the other hand, in the case in which the agent is not user-owned (step S276/No), the notification control section 355 decides to recommend the selected agent (step S285), and controls the issuing of a notification encouraging the user to purchase the agent (step S288).

(4-2-2. Mid-Dialogue Agent Switching Control Process)

Figure 17:
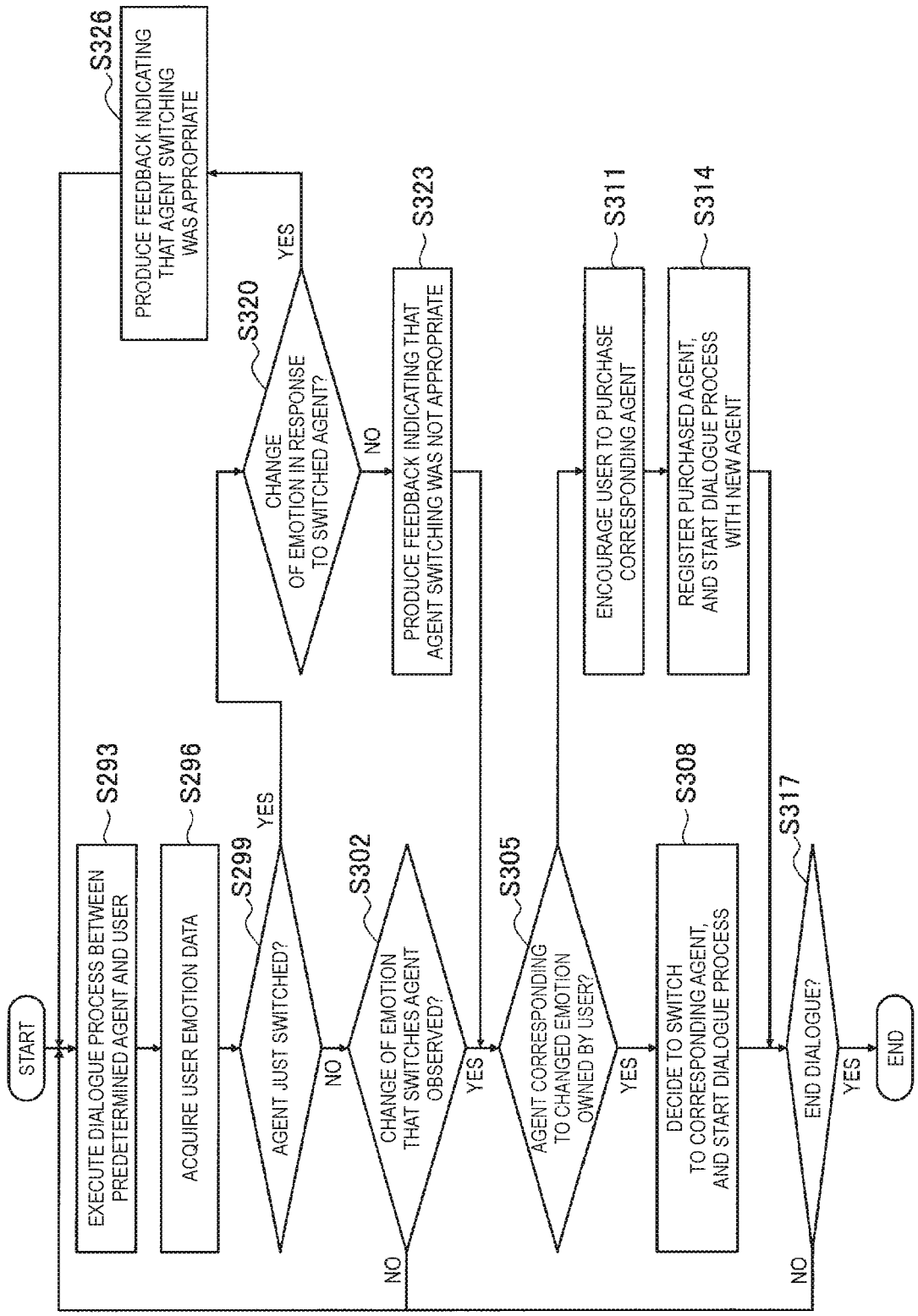
FIG. 17 is a flowchart illustrating an agent switching control process during a dialogue according to the present embodiment.

Next, mid-dialogue agent switching control will be described with reference to FIG. 17. FIG. 17 is a flowchart illustrating an agent switching control process during a dialogue according to the present embodiment.

As illustrated in FIG. 17, first, while the dialogue process between a predetermined agent and the user is already being executed (step S293), the dialogue processing section 30a acquires user emotion data (step S296).

Next, the dialogue processing section 30a determines whether or not the agent has just been switched (step S299). This is because the operating process illustrated in FIG. 17 includes a process that automatically accounts for feedback from the user.

After that, in the case in which the agent has not just been switched (step S299/No), the dialogue processing section 30a determines whether or not a change in the emotion that switches the agent has been observed (step S302).

Next, in the case in which there is no change of emotion (step S302/No), the dialogue processing section 30a returns to the state of dialogue with the user (step S293), whereas in the case of a change (step S302/Yes), the dialogue processing section 30a selects an agent corresponding to the changed emotion with the selection section 353, and determines whether or not the selected agent is user-owned (step S305). The agent corresponding to the changed emotion is selected on the basis of the "applicable emotion" in the agent information stored in the agent DB 36. Also, whether or not the agent is owned by the user is determined on the basis of the user information stored in the user information DB 37.

After that, in the case in which the agent corresponding to the changed emotion is user-owned (step S305/Yes), the switching control section 354 decides to switch to the corresponding agent, and controls the starting of the dialogue process with the agent (step S308). With this arrangement, it becomes possible to execute agent switching control even in the case in which the user emotion changes in the middle of a dialogue with the agent. By appropriately changing the agent and executing the dialogue process, a user who is in a negative emotional state may be guided into a positive emotional state, for example.

On the other hand, in the case in which the agent corresponding to the changed emotion is not user-owned (step S305/No), the notification control section 355 controls the issuing of a notification encouraging the user to purchase the corresponding agent (step S311).

Next, if the user purchases the recommended agent, the registration section 351 registers the agent in the user information DB 37 as a user-owned agent, and the switching control section 354 controls the starting of the dialogue process with the registered new agent (step S314).

Next, in the above step S299, in the case in which the agent has just been switched (step S299/Yes), the dialogue processing section 30a determines whether or not there is a change of emotion in response to the switched agent, on the basis of acquired emotion data (step S320). In the present embodiment, whether or not the switched agent has had an effect is evaluated on the basis of the presence or absence of an emotion change.

After that, in the case in which there is no change of emotion in response to the switched agent (step S320/No), the feedback processing section 356 produces feedback indicating that the switching of the agent was not appropriate (step S323). For example, after starting the dialogue process by a corresponding agent with a user experiencing a sad emotion, in the case in which the emotion does not change, the switching of the agent is evaluated to be ineffective. Also, in the case in which the user becomes even more sad, the switching of the agent is evaluated to be ineffective.

Feedback indicating ineffectiveness is taken into account during the selection of a corresponding agent in the above step S305. In other words, the selection section 353 selects an agent other than the ineffective agents from among the agents corresponding to the emotion of the user.

On the other hand, in the case in which there is a change of emotion in response to the switched agent (step S320/Yes), the feedback processing section 356 produces feedback indicating that the switching of the agent was appropriate (step S326), and the dialogue with the user is continued (step S293). For example, in the case of a rise in the user's heart rate detected by a wearable terminal worn by the user, the dialogue by the switched agent is considered to be effective. Also, feedback indicating appropriateness may be registered as preference information (the specification of a preferred agent for a certain emotion) in the user information stored in the user information DB 37, for example.

Subsequently, the above steps S293 to S314 are repeated until the dialogue ends (step S317).

(4-2-3. Feedback Process)

In the operating process described above, taking automatic feedback into account is described, but herein, each of a manual and an automatic feedback process according to the present embodiment will be described. In the present embodiment, it is possible to evaluate whether an agent selected and recommended automatically on the system side is an agent desired by the user at the time. The feedback may be input directly by the user manually on the client terminal 1, or automatic feedback may be produced in accordance with the presence or absence of an emotion change in the user.

Figure 18:
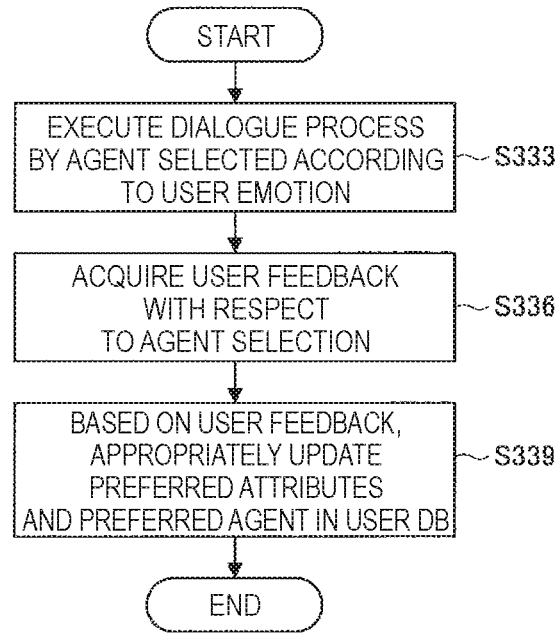
FIG. 18 is a flowchart illustrating a feedback process according to the present embodiment.

FIG. 18 is a flowchart illustrating a feedback process according to the present embodiment. First, the dialogue processing section 30a executes the dialogue process with the user by an agent selected according to the user emotion (step S333).

After that, the dialogue processing section 30a acquires user feedback with respect to the agent selection (step S336). For example, on the client terminal 1, an evaluation indicating that the switch to this agent at this timing was good or bad is input through speech or text by the user, and transmitted to the agent server 2.

Next, on the basis of the user feedback, the feedback processing section 356 appropriately updates the user's preferred attributes and preferred agents included in the user information DB 37 (step S339). For example, when User b is in a sad state, the agent with the agent ID: 10001 is selected and the dialogue process with the agent is started, but in the case in which User b prefers to talk to the agent with the agent ID: 10002 when sad, the preference for the agent ID: 10002 is input into the client terminal 1 by speech or text, and transmitted to the agent server 2 as feedback. In this case, on the basis of the feedback, the feedback processing section 356 adds "Preferred agent ID" like in Table 3 below in the user information of User b stored in the user information DB 37, for example. With this arrangement, the next time the selection section 353 selects an agent, Table 3 below is referenced, and the agent with the agent ID: 10002 is selected.

TABLE 3

| User ID | Owned agents (already purchased) | Preferred agent attributes | Preferred agent ID |
| --- | --- | --- | --- |
| b | 10001, 10002 | When sad: Consoling | When sad: 10002 |

Also, in the case in which User b provides feedback indicating that a maid agent is preferred when the user is sad, the feedback processing section 356 adds "Preferred agent attributes" like in Table 4 below in the user information of User b stored in the user information DB 37.

TABLE 4

| User ID | Owned agents (already purchased) | Preferred agent attributes | Preferred agent ID |
| --- | --- | --- | --- |
| b | 10001, 10002 | When sad: Consoling When sad: Maid | — |

Also, when User d is sad, the agent ID: 10001 "Beautiful" is selected, but in the case of providing feedback indicating that "Beautiful" is not preferred in the case of such an emotional state, the feedback processing section 356 adds a setting indicating that beautiful is not preferred when the user is sad like in Table 5 below in the user information of User d stored in the user information DB 37. Herein, as an example, the flag "−1" indicating a non-preferred state is added.

TABLE 5

| User ID | Owned agents (already purchased) | Preferred agent attributes | Preferred agent ID |
| --- | --- | --- | --- |
| d | 10001, 10002 | When sad: Beautiful (−1) | |

The above describes a process in the case of manual feedback. Next, the process in the case of automatic feedback will be described.

Figure 19:
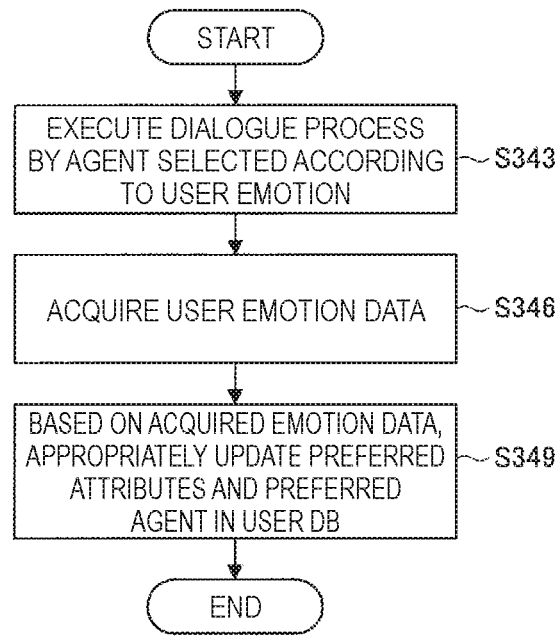
FIG. 19 is a flowchart illustrating an automatic feedback process according to the present embodiment.

FIG. 19 is a flowchart illustrating an automatic feedback process according to the present embodiment. As illustrated in FIG. 19, first, the dialogue processing section 30a executes the dialogue process with the user by an agent selected according to the user emotion (step S343).

After that, the dialogue processing section 30a acquires user emotion data (step S346). The user emotion data is estimated by the emotion estimation section 352 on the basis of sensor data received from the client terminal 1 through the communication section 38, for example. Also, the user emotion data may be estimated on the basis of sensor data in the client terminal 1, and transmitted to the agent server 2.

Next, on the basis of the acquired user emotion data, the feedback processing section 356 appropriately updates the user's preferred attributes and preferred agents included in the user information DB 37 (step S349). For example, assume that when User d is in a sad state, the agent with the agent ID: 10001 is selected, and the dialogue process with the agent is started. At this time, the heartbeat of User d is detected and the face of User d is captured, and the heartbeat data and the captured image of the face are transmitted from the client terminal 1 to the agent server 2. On the basis of this data, if the emotion estimation section 352 detects that the heart rate of User d has risen or that User d has smiled, the feedback processing section 356 automatically acquires an evaluation indicating that the selected agent (here, agent ID: 10001) matches the preferences of User d. Consequently, the feedback processing section 356 may set preferred attributes and preferred agent IDs when the user is sad like in Table 6 below in the user information of User d stored in the user information DB 37. In the example illustrated in Table 6, both agent attributes and an agent ID are recorded, but only one of the two may also be recorded.

TABLE 6

| User ID | Owned agents (already purchased) | Preferred agent attributes | Preferred agent ID |
| --- | --- | --- | --- |
| d | 10001, 10002 | When sad: Consoling When sad: Beautiful | When sad: 10001 |

5. SUPPLEMENT

Figure 20:
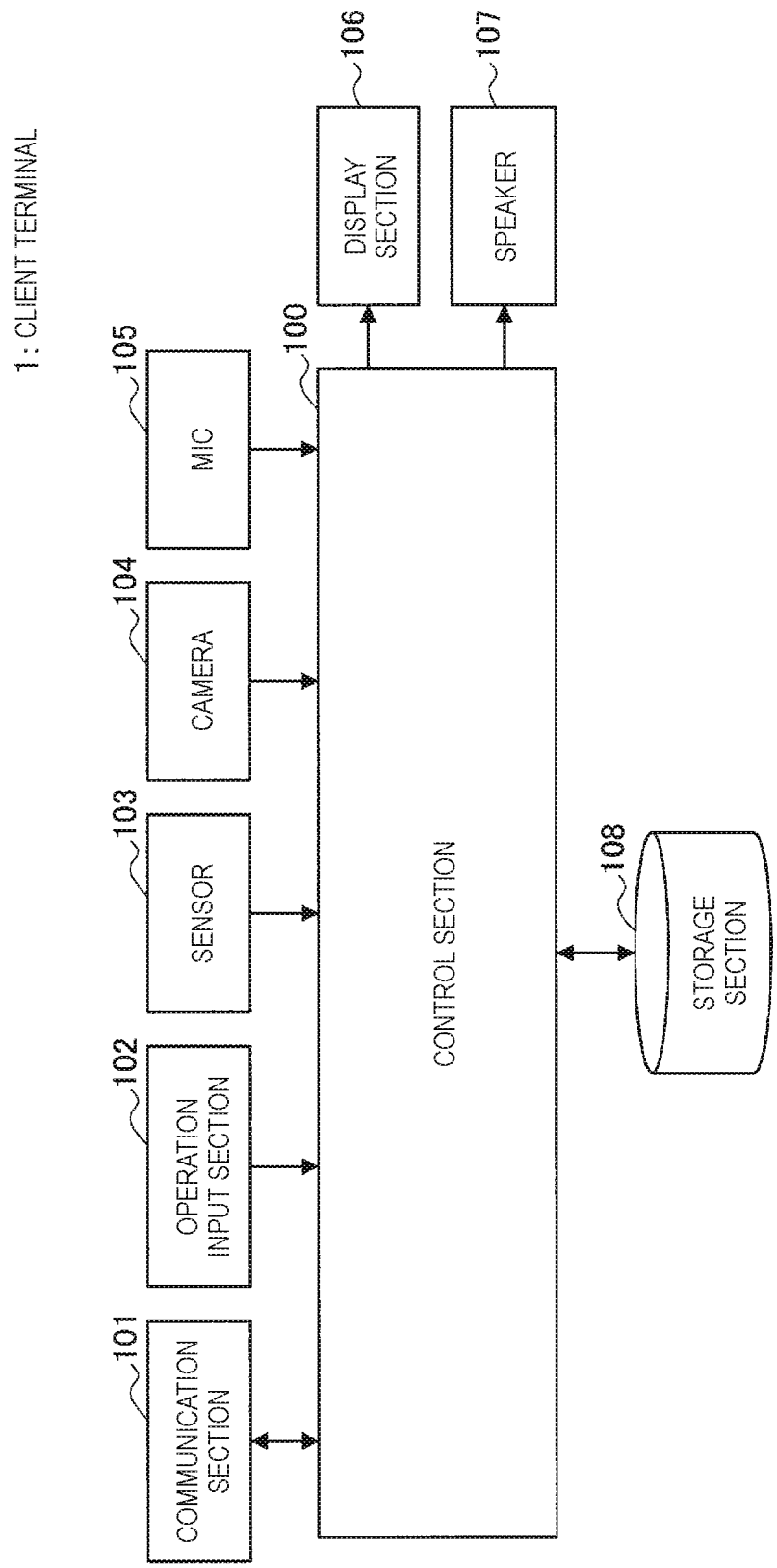
FIG. 20 is a block diagram illustrating an example of a configuration of a client terminal 1 according to the present embodiment.

As a supplement, a configuration of the client terminal 1 according to the present embodiment will be described with reference to FIG. 20. FIG. 20 is a block diagram illustrating an example of a configuration of the client terminal 1 according to the present embodiment. As illustrated in FIG. 20, the client terminal 1 includes a control section 100, communication section 101, an operation input section 102, a sensor 103, a camera 104, a mic (an abbreviation of microphone) 105, a display section 106, a speaker 107, and a storage section 108.

The control section 100 is realized by a processor such as a central processing unit (CPU) included in the client terminal 1, for example. The control section 100 according to the present embodiment controls the playback from the speaker 107 of response speech of the agent transmitted from the agent server 2 through the communication section 101, and controls the display of an image of the agent on the display section 106, for example.

In addition, the control section 100 controls the transmission of user-related information utilized by the agent server 2 from the communication section 101 to the agent server 2 over the network 3. For example, the control section 100 transmits user information input from the operation input section 102, a captured image captured by the camera 104, user speech collected by the mic 105, sensing data detected by the sensor 103, and sensing data acquired by wireless communication with a sensor existing near the client terminal 1, from the communication section 101 to the agent server 2 over the network 3. This data is used when estimating the user emotion in the dialogue processing section 30a of the agent server 2, for example. Sensing data used to estimate the user emotion is transmitted continually, even while the user is engaged in dialogue with the agent through the client terminal 1. In addition, the control section 100 may also transmit a user emotion estimated on the basis of sensing data detected automatically by the sensor 103 or the like as user-related information.

Also, the control section 100 controls the starting of receiving the agent service from the agent server 2 that provides automatic dialogue by an agent owned by the user.

Also, the control section 100 controls the acquisition of feedback from the user enjoying the agent service by the agent server 2 (engaging in dialogue with an owned agent), and the transmission of such feedback from the communication section 101 to the agent server 2. Such feedback may be input manually by the user from the operation input section 102 or the mic 105, may be sensing data detected automatically by the sensor 103 or the like, or may be a user emotion estimated on the basis of the sensing data.

The communication section 101 is a communication interface including a communication device and the like for connecting to the network 3, for example. The communication section 101 may be a local area network (LAN), Bluetooth (registered trademark), Wi-fi, or Wireless USB (WUSB) communication card or the like, for example. Additionally, the communication section 101 may also be an optical communication router, an asymmetric digital subscriber line (ADSL) router, a modem for any of various types of communication, or the like. The communication section 101 transmits and receives signals or the like to and from the Internet or another communication device using a predetermined protocol such as TCP/IP, for example. Also, the network 3 connected to the communication section 101 is a network connected in a wired or wireless manner, and may include the Internet, a home LAN, infrared communication, radio-wave communication, satellite communication, or the like, for example.

The operation input section 102 includes a function of receiving the input of user operations, and outputting to the control section 100. The operation input section 102 is realized by a mouse, a keyboard, a touch panel, buttons, switches, levers, or the like, for example.

The sensor 103 includes a function of detecting the user or surrounding conditions. For example, the sensor 103 is realized by a biological sensor (such as a pulse monitor, a heart rate monitor, a perspiration sensor, a body temperature sensor, a blood pressure sensor, or an electroencephalograph), an environment sensor (such as a temperature sensor, an illumination sensor, or a pressure sensor), an acceleration sensor, a gyro sensor, a direction sensor, a vibration sensor, a positioning sensor, or the like.

The camera 104 includes each of a lens system including an imaging lens, a diaphragm, a zoom lens, a focus lens, and the like, a driving system that causes the lens system to execute focus operations and zoom operations, a solid-state image sensor array that generates an imaging signal by photoelectric conversion of imaging light obtained with the lens system, and the like. The solid-state image sensor array may be realized by a charge-coupled device (CCD) sensor array or a complementary metal-oxide-semiconductor (CMOS) sensor array, for example.

The mic 105 collects and outputs user speech and surrounding environment sounds to the control section 100 as sound data.

The display section 106 includes a function of displaying text, graphics, images, video, and the like. The display section 106 is realized by a liquid crystal display (LCD) device, an organic light-emitting diode (OLED) device, or the like, for example.

The speaker 107 includes a function of playing back sound signals.

The storage section 108 stores programs and parameters by which the control section 100 executes each function. For example, the storage section 108 may store user information such as a user ID, name, age, gender, agent preference information, and owned agent information.

6. CONCLUSION

As described above, in the communication control system according to an embodiment of the present disclosure, an appropriate agent is selected from among multiple agents according to a user emotion, thereby making it possible to provide more comfortable dialogue. Also, if the selected agent is user-owned (that is, already purchased), agent switching is performed, whereas if not yet purchased, it becomes possible to recommend purchase to the user.

Furthermore, by executing an evaluation of the selected agent manually or automatically, the user convenience of the system is improved.

In addition, the emotion sensing (emotion estimation based on various sensor data) may be executed continually, and the dialogue processing section 30a may switch the agent at the timing when a change of user emotion is detected. In cases of intense emotion changes, the agent switching may be executed in units of conversations in the dialogue in some cases.

Also, in the agent system according to the present embodiment, in the case in which a change of user emotion occurs even while the user is interacting, it is possible to switch immediately to an agent likely to match the emotion, thereby making it possible for the user to continue the dialogue with a more comfortable agent.

Also, in the present embodiment, while the user is enjoying (interacting with) the agent service, it is possible to acquire the user emotion as feedback, additionally learn the user's preferences, and select or recommend an agent matching the user's emotion and preferences.

Also, the agent system according to the present embodiment is not limited to a configuration including the client terminal 1 and the agent server 2 as illustrated in FIG. 2, and is also capable of providing the agent service with the single client terminal 1 alone, for example. Specifically, by providing the client terminal 1 with the configuration of the agent server 2 illustrated in FIG. 3 and the configuration of the dialogue processing section 30a illustrated in FIG. 15, control of automatic dialogue by the agent with respect to user speech, control of agent switching in response to the user emotion, and the like become possible.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing hardware such as a CPU, ROM, and RAM built into the client terminal 1 or the agent server 2 described above to exhibit the functions of the client terminal 1 or the agent server 2. Also, a computer-readable storage medium storing the computer program is provided.

In addition, the embodiment described above illustrates a configuration in which various functions are realized by the agent server 2 on the Internet, but the present embodiment is not limited thereto, and at least part of the configuration of the agent server 2 illustrated in FIG. 3 may also be in the client terminal 1 (a smartphone, wearable terminal, or the like) of the user. Also, the entire configuration of the agent server 2 illustrated in FIG. 3 may be provided in the client terminal 1, and all processes may be executed on the client terminal 1.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing system including:
a storage section that holds a plurality of agent programs with different attributes;
a communication section that provides an agent service by the agent programs to a client terminal of a user; and
a control section that selects, from among the plurality of agent programs, one agent program suited to an emotion of a user who can use the agent service.

(2)
The information processing system according to (1), in which
when providing an agent service by a first agent program to a client terminal of the user, if an emotion change of the user is detected, the control section controls a switching to an agent service by a second agent program appropriate to the emotion change.

(3)
The information processing system according to (1) or (2), in which
when the user owns a usage right to the agent service by the selected agent program, the control section starts providing the agent service by the selected agent program to the user.

(4)
The information processing system according to (3), in which
the control section stores, in the storage section, preference information of the user according to feedback received from the user enjoying the agent service.

(5)
The information processing system according to (4), in which
the control section selects, from among the plurality of agent programs, one agent program suited to an emotion of the user who can use the agent service, on a basis of the preference information.

(6)
The information processing system according to (4) or (5), in which
the feedback is input through text or speech by the user on the client terminal.

(7)
The information processing system according to (4) or (5), in which
the feedback is at least one of biological information, speech information, a captured image, and action information of the user detected automatically by a sensor that is able to communicate with the client terminal.

(8)
The information processing system according to any one of (4) to (7), in which
the feedback is emotion information based on at least one of biological information, speech information, a captured image, and action information of the user detected automatically by a sensor that is able to communicate with the client terminal.

(9)
The information processing system according to (1) or (2), in which
when the user does not own a usage right to the agent service by the selected agent program, the control section controls an issuing of a notification encouraging the user to purchase the selected agent program.

(10)
The information processing system according to any one of (1) to (9), in which
the storage section stores applicable user emotion information for each of the agent programs, and
the control section selects, from among the plurality of agent programs, one agent program suited to an emotion of the user who can use the agent service, according to the applicable user emotion.

(11)
The information processing system according to any one of (1) to (10), in which
the control section estimates the emotion of the user on a basis of biological information of the user transmitted from the client terminal.

(12)
The information processing system according to any one of (1) to (10), in which
the emotion of the user is estimated on a basis of biological information of the user in the client terminal, and transmitted.

(13)
A client terminal including:
a communication section that receives dialogue by an agent service by an agent program from a server that holds a plurality of agent programs with different attributes; and
a control section that controls a transmission, to the server through the communication section, of user-related information needed by the server to select, from among the plurality of agent programs, one agent program suited to an emotion of a user who can use the agent service.

(14)
The client terminal according to (13), in which
while a provision of an agent service by a first agent program is being received, the control section controls a continual transmission of the user-related information through the communication section, and if an emotion change of the user is detected by the server, the control section controls a reception of dialogue by an agent service by an appropriate second agent program switched according to the emotion change.

(15)
The client terminal according to (13) or (14), in which
when the user owns a usage right to the agent service by the selected agent program, the control section starts receiving, through the communication section, the agent service with respect to the user by the selected agent program.

(16)

The client terminal according to any one of (13) to (15), in which
the control section controls a transmission, through the communication section, of feedback from the user enjoying the agent service.

(17)

The client terminal according to (16), in which
the feedback is input through text or speech on the client terminal by the user.

(18)

The client terminal according to (16), in which
the feedback is biological information of the user detected automatically by a sensor that is able to communicate with the client terminal.

(19)

The client terminal according to (16), in which
the feedback is emotion information based on biological information of the user detected automatically by a sensor that is able to communicate with the client terminal.

(20)

The client terminal according to (13), in which
when the user does not own a usage right to the agent service by the selected agent program, the control section receives, through the communication section, a notification encouraging the user to purchase the selected agent program.

(21)

The client terminal according to any one of (13) to (20), in which
the control section controls a transmission of biological information of the user detected by a sensor that is able to communicate with the client terminal, as the user-related information.

(22)

The client terminal according to any one of (13) to (20), in which
the control section controls a transmission of an emotion of the user estimated on a basis of biological information of the user detected by a sensor that is able to communicate with the client terminal, as the user-related information.

(23)

An information processing system including:
a storage section that holds a plurality of agent programs with different attributes;
an interface section that provides an agent service by the agent program to a user; and
a control section that selects one agent program suited to an emotion of a user who can use the agent service by the agent program, and executes the selected agent program to thereby provide a specific agent service to the user through the interface section.

(24)

An information processing method including, by a processor:
holding a plurality of agent programs with different attributes in a storage section;
providing, through a communication section, an agent service by the agent programs to a client terminal of a user; and
selecting, from among the plurality of agent programs, one agent program suited to an emotion of a user who can use the agent service.

(25)

A program causing a computer to function as:
a communication section that receives dialogue by an agent service by an agent program from a server that holds a plurality of agent programs with different attributes; and
a control section that controls a transmission, to the server through the communication section, of user-related information needed by the server to select, from among the plurality of agent programs, one agent program suited to an emotion of a user who can use the agent service.

(26)

A program causing a computer to function as:
a storage section that holds a plurality of agent programs with different attributes;
an interface section that provides an agent service by the agent program to a user; and
a control section that selects one agent program suited to an emotion of a user who can use the agent service by the agent program, and executes the selected agent program to thereby provide a specific agent service to the user through the interface section.

REFERENCE SIGNS LIST 1 client terminal
2 agent server
30 dialogue processing section
300 dialogue processing section
310 question search section
320 response generation section
330 conversation DB
340 phoneme data acquisition section
30a dialogue processing section
31 basic dialogue processing section
32 character A dialogue processing section
32a agent ID: 10001 dialogue processing section
32b agent ID: 10001 dialogue processing section
32c agent ID: 10001 dialogue processing section
33 person B dialogue processing section
34 person C dialogue processing section
35 control section
351 registration section
352 emotion estimation section
353 selection section
354 switching control section
355 notification control section feedback processing section
36 agent DB
37 user information DB
38 communication section
40 phoneme storage section
41 basic phoneme DB
42 character A phoneme DB
43 person B phoneme DB
44 person C phoneme DB
50 conversation DB generation section
60 phoneme DB generation section
70 advertisement insertion processing section
72 advertisement DB
80 feedback acquisition processing section
3 network
10 agent

The invention claimed is:

1. An information processing system, comprising:
a storage section configured to:
store a plurality of agents associated with a plurality of attributes; and store phoneme data corresponding to each of the plurality of agents;
a communication section configured to receive user-related information from a client terminal of a user; and
a control section configured to:
determine an emotion of the user based on the received user-related information;
select, from the plurality of agents, a first agent based on the determined emotion of the user;
execute, based on the stored phoneme data corresponding to the selected first agent, a first dialogue process between the selected first agent and the user; and
provide an agent service to the client terminal of the user based on the execution of the first dialogue process.

2. The information processing system according to claim 1, wherein the control section is further configured to:
detect a change in the determined emotion of the user during the execution of the first dialogue process;
switch to a second agent of the plurality of agents based on the detected change in the determined emotion of the user change;
execute a second dialogue process between the second agent and the user; and
provide the agent service to the client terminal of the user based on the execution of the second dialogue process.

3. The information processing system according to claim 1, wherein the control section is further configured to execute the first dialogue process based on information indicating that the user owns a usage right for the selected first agent.

4. The information processing system according to claim 3, wherein the control section is further configured to:
acquire a user feedback associated with the agent service provided to the client terminal; and
store, in the storage section, preference information of the user based on the acquired user feedback.

5. The information processing system according to claim 4, wherein the control section is further configured to select, from the plurality of agents, the first agent based on the stored preference information.

6. The information processing system according to claim 4, wherein the acquired user feedback is input through one of text or speech by the user on the client terminal.

7. The information processing system according to claim 4, wherein
the acquired user feedback is at least one of biological information, speech information, a captured image, or action information of the user,
sensor detects the at least one of the biological information, the speech information, the captured image, or the action information, and
the sensor transmits the detected at least one of the biological information, the speech information, the captured image, or the action information to the client terminal.

8. The information processing system according to claim 4, wherein
the acquired user feedback is emotion information based on at least one of biological information, speech information, a captured image, or action information of the user,
a sensor detects the at least one of the biological information, the speech information, the captured image, or the action information, and the sensor transmits the detected at least one of the biological information, the speech information, the captured image, or the action information to the client terminal.

9. The information processing system according to claim 1, wherein
the control section is further configured to issue, in a case where the user does not own a usage right for the selected first agent, a notification for encouragement of the user to purchase the selected first agent.

10. The information processing system according to claim 1, wherein
the storage section is further configured to store applicable user emotion information for each of the plurality of agents, and
the control section is further configured to select, from the plurality of agents, the first agent based on the stored applicable user emotion information.

11. The information processing system according to claim 1, wherein the control section is further configured to:
receive, from the client terminal, biological information of the user; and
determine the emotion of the user based on the biological information of the user.

12. The information processing system according to claim 1, wherein
the client terminal estimates the emotion of the user based on biological information of the user, and
the control section is further configured to receive the estimated emotion of the user as the user-related information, from the client terminal.

13. A client terminal, comprising:
a communication section; and
a control section configured to:
control the communication section to transmit user-related information to a server,
wherein the server:
stores a plurality of agents associated with a plurality of attributes,
stores phoneme data corresponding to each of the plurality of agents,
determines an emotion of a user of the client terminal based on the user-related information,
selects a first agent from the plurality of agents based on the determined emotion of the user, and
executes, based on the stored phoneme data corresponding to the selected first agent, a first dialogue process between the selected first agent and the user; and
control the communication section to receive, from the server, a first dialogue corresponding to an agent service, wherein
the first dialogue is received based on the execution of the first dialogue process, and
the agent service is associated with the selected first agent.

14. The client terminal according to claim 13, wherein the control section is further configured to control the communication section to continually transmit the user-related information,
the server detects a change in the determined emotion of the user during the execution of the first dialogue process,
the server switches to a second agent of the plurality of agents based on the detected change in the determined emotion of the user,
the server executes a second dialogue process between the second agent and the user, the control section is further configured to control the communication section to receive a second dialogue from the server, and
the second dialogue is received based on the execution of the second dialogue process.

15. The client terminal according to claim 13, wherein
the control section is further configured to control the communication section to receive the agent service, and
the agent service is received based on information indicating that the user owns a usage right for the selected first agent.

16. The client terminal according to claim 13, wherein
the control section is further configured to control the communication section to transmit feedback of the user to the server and
the feedback is associated with the agent service.

17. The client terminal according to claim 16, wherein the transmitted feedback is input through one of text or speech on the client terminal by the user.

18. The client terminal according to claim 16, wherein
a sensor detects biological information of the user,
the control section is further configured to control the communication section to receive the biological information of the user from the sensor, and
the transmitted feedback corresponds to the biological information of the user.

19. The client terminal according to claim 18, wherein
the transmitted feedback corresponds to emotion information, and
the emotion information is based on the biological information of the user.

20. The client terminal according to claim 13, wherein
the control section is further configured to control, in a case where the user does not own a usage right for the selected first agent, the communication section to receive a notification for encouragement of the user to purchase the selected first agent.

21. The client terminal according to claim 13, wherein
a sensor detects biological information of the user, and
the control section is further configured to control the communication section to:
receive the biological information of the user from the sensor, and transmit, to the server, the biological information of the user as the user-related information.

22. The client terminal according to claim 13, wherein
a sensor detects biological information of the user, and
the control section is further configured to:
control the communication section to receive the biological information of the user from the sensor;
estimate the emotion of the user based on the biological information of the user; and
control the communication section to transmit, to the server, the estimated emotion of the user as the user-related information.

23. An information processing system, comprising:
a storage section configured to:
store a plurality of agents associated with a plurality of attributes; and
store phoneme data corresponding to each of the plurality of agents; a control section configured to:
receive user-related information from a client terminal of a user;
determine an emotion of the user based on the received user-related information;
select an agent from the plurality of agents based on the determined emotion of the user; and
execute, based on the stored phoneme data corresponding to the selected agent, a dialogue process between the selected agent and the user; and
an interface section configured to provide a specific agent service to the client terminal of the user based on the execution of the dialogue process.

24. An information processing method, comprising:
in an information processing system:
storing, by a storage section of the information processing system, a plurality of agents associated with a plurality of attributes;
storing, by the storage section, phoneme data corresponding to each of the plurality of agents;
receiving, by a communication section of the information processing system, user-related information from a client terminal of a user;
determining, by a control section of the information processing system, an emotion of the user based on the received user-related information;
selecting, by the control section, an agent from the plurality of agents based on the determined emotion of the user;
executing, by the control section, a dialogue process between the selected agent and the user, based on the stored phoneme data corresponding to the selected agent; and
providing, by the control section, a specific agent service to the client terminal of the user based on the execution of the dialogue process.

25. A non-transitory computer-readable medium having stored thereon computer-executable instructions that, when executed by a client terminal, cause the client terminal to execute operations, the operations comprising:
controlling, by a control section of the client terminal, a communication section of the client terminal to transmit user-related information to a server,
wherein the server:
stores a plurality of agents associated with a plurality of attributes,
stores phoneme data corresponding to each of the plurality of agents,
determines an emotion of a user of the client terminal based on the user-related information,
select an agent from the plurality of agents based on the determined emotion of the user, and
execute, based on the stored phoneme data corresponding to the selected agent, a dialogue process between the selected agent and the user; and
controlling, by the control section, the communication section to receive a dialogue from the server, wherein
the dialogue is received based on the execution of the dialogue process, and
the dialogue corresponds to a specific agent service associated with the selected agent.

26. A non-transitory computer-readable medium having stored thereon computer-executable instructions that, when executed by an information processing system, cause the information processing system to execute operations, the operations comprising:
storing, by a storage section of the information processing system, a plurality of agents associated with a plurality of attributes;
storing, by the storage section, phoneme data corresponding to each of the plurality of agents;

receiving, by a control section of the information processing system, user-related information from a client terminal of a user;

determining, by the control section, an emotion of the user based on the received user-related information;

selecting, by the control section, an agent from the plurality of agents based on the determined emotion of the user;

executing, by the control section, a dialogue process between the selected agent and the user, based on the stored phoneme data corresponding to the selected agent; and providing, by an interface section of the information processing system, a specific agent service to the client terminal of the user based on the execution of the dialogue process.

* * * * *